(12) United States Patent
Harutyunyan et al.

(10) Patent No.: US 10,402,253 B2
(45) Date of Patent: Sep. 3, 2019

(54) METHODS AND SYSTEMS TO DETECT AND CLASSIFY CHANGES IN A DISTRIBUTED COMPUTING SYSTEM

(71) Applicant: VMware, Inc., Palo Alto, CA (US)

(72) Inventors: Ashot Nshan Harutyunyan, Yerevan (AM); Arnak Poghosyan, Yerevan (AM); Naira Movses Grigoryan, Yerevan (AM); Nicholas Kushmerick, Seattle, WA (US); Harutyun Beybutyan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 170 days.

(21) Appl. No.: 15/607,944

(22) Filed: May 30, 2017

(65) Prior Publication Data
US 2018/0349221 A1    Dec. 6, 2018

(51) Int. Cl.
  *G06F 11/07*    (2006.01)
(52) U.S. Cl.
  CPC ........ *G06F 11/0781* (2013.01); *G06F 11/079* (2013.01)
(58) Field of Classification Search
  CPC ............... G06F 11/0781; G06F 11/079; G06F 11/0793; G06F 11/3452
  See application file for complete search history.

(56) References Cited

U.S. PATENT DOCUMENTS

| 8,156,377 B2* | 4/2012 | Li | G06F 11/079 |
| | | | 714/26 |
| 8,230,262 B2* | 7/2012 | Li | G06F 11/008 |
| | | | 714/26 |
| 8,291,263 B2* | 10/2012 | Li | G06F 11/008 |
| | | | 714/26 |

OTHER PUBLICATIONS

Downey, Allen B., "A novel changepoint detection algorithm," pp. 1-11, Dec. 5, 2008.

* cited by examiner

*Primary Examiner* — Joseph R Kudirka

(57) ABSTRACT

Methods and systems are directed to detecting and classifying changes in a distributed computing system. Divergence value are computed from distributions of different types of event messages generated in time intervals of a sliding time window. Each divergence value is a measure of change in types of events generated in each time interval. When a divergence value, or a rate of change in divergence values, exceeds a threshold, the time interval associated with the threshold violation is used to determine a change point in the operation of the distributed computing system. Based on the change point, a start time of the change is determined. The change is classified based on various previously classified change points in the disturbed computing system. A recommendation may be generated to address the change based on the classification of the change.

18 Claims, 37 Drawing Sheets

```
log.write([$Time_date] [Thread-$x/$IP/INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[$Time_date] Repair session $RS for range $range finished)
```

FIG. 15

```
[2015-03-10 23:43:36.859+0000] [Thread-1822496/127.0.0.1 INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[2015-03-10 23:43:36,716] Repair session 51312720-c77e-11e4-ad72-4769d614a3f2 for range
(-6899937477235537626, -6896547230076663429) finished]
```

FIG. 16

2013-12-02T10:44:24.095Z li-qe-esx5.vmware.com Rhttpproxy:
[28959B90 verbose 'Proxy Req 46691'] Connected to
localhost:8307

2013-12-02T10:44:24.094Z li-qe-esx5.vmware.com Rhttpproxy:
[FFFC2B90 verbose 'Proxy Req 46691'] new proxy client
TCP (local-127.0.0.1:80, peer=127.0.0.1:50155)

2013-12-02T10:44:24.093Z li-qe-esx5.vmware.com Rhttpproxy:
[2889B90 verbose 'Proxy Req 46685'] The client closed the
stream, not unexpectedly.

Dec  2 18:48:29 strata-vc 2013-12-02T18:48:30.273Z
[7FA39448B700 info 'commonvpxLro' opID=1947d6f9]  [VpxLRO] -
FINISH task-internal-2163522 -- -- vim.SessionManager.logout -

2013-12-02T18:48:51.396Z strata-esx1.eng.vmware.com Vpxa:
[65B5AB90 verbose 'VpxaHalCnxHostagent' opID=WFU-ed393333]
[WaitForUpdatesDone] Completed callback 2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed

FIG. 17

METHODS AND SYSTEMS TO DETECT AND CLASSIFY CHANGES IN A DISTRIBUTED COMPUTING SYSTEM

TECHNICAL FIELD

The present disclosure is directed to detecting and classifying changes in a distributed computing system based on event messages generated by an event source running in the distributed computing system.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies.

In order to proactively manage a distributed computing system, system administrators are interested in detecting anomalous behavior in the operation of the disturbed computing system and changes in behavior of the distributed computing system. In recent years, management servers have been developed to monitor the behavior of numerous and various virtual and physical objects of a distributed computing system. A typical management server collects time series metric data from the objects and applies dynamic thresholding techniques to the metric data to identify any number of various anomalies in the operation of the distributed computing system. For example, when metric data of an object violates a threshold, the management server generates an alert that notifies administrators of the anomalous behavior. However, identifying and classifying changes in behavior of a distributed computing system has proven more challenging. Changes have many different causes, including a new software bug, hardware failure, software upgrade, configuration changes, and change in workload. Administrators seek automated methods that identify and classify changes that affect the operations of distributed computing systems.

SUMMARY

Methods described herein are directed to detecting and classifying changes in a distributed computing system using event messages generated by event sources running in the distributed computing system. Methods compare past and current behavior of the event sources in order to detect a change point in the operation of the event sources. A change point is a point in time when a significant change has occurred in the operation of the event source. In one aspect, event messages generated by an event source of the distributed computing system are ingested over time. A divergence value is computed from the distribution of different types of event messages generated in each overlapping time interval of a sliding time window. Each divergence value is a measure of how much the different types of events recorded in the event messages change within each time interval. When a divergence value exceeds a threshold, or the rate of change in divergence values exceeds a threshold, the time interval associated with the threshold violation is identified as a change point in the operation of the distributed computing system. And the time interval associated with the change point provides an approximate time for when the behavior of the event source changed significantly from past behavior. Based on the change point, methods described herein detect a start time of the change and classify the change based on various distributions of event types associated with previously classified change points in the disturbed computing system. A recommendation may be generated to address the change based on the classification of the change. Methods also include a real-time evaluation of event messages to determine the change point. The methods described herein provide a unique perspective and added dimension to the task of detecting a change in the operation of a distributed computing system from methods that rely on analyzing metric data alone.

DESCRIPTION OF THE DRAWINGS

FIG. 15 shows an example of a log write instruction.

FIG. 16 shows an example of an event message generated by a log write instruction.

FIG. 17 shows a small, eight-entry portion of an event log.

DETAILED DESCRIPTION

Figure 1:
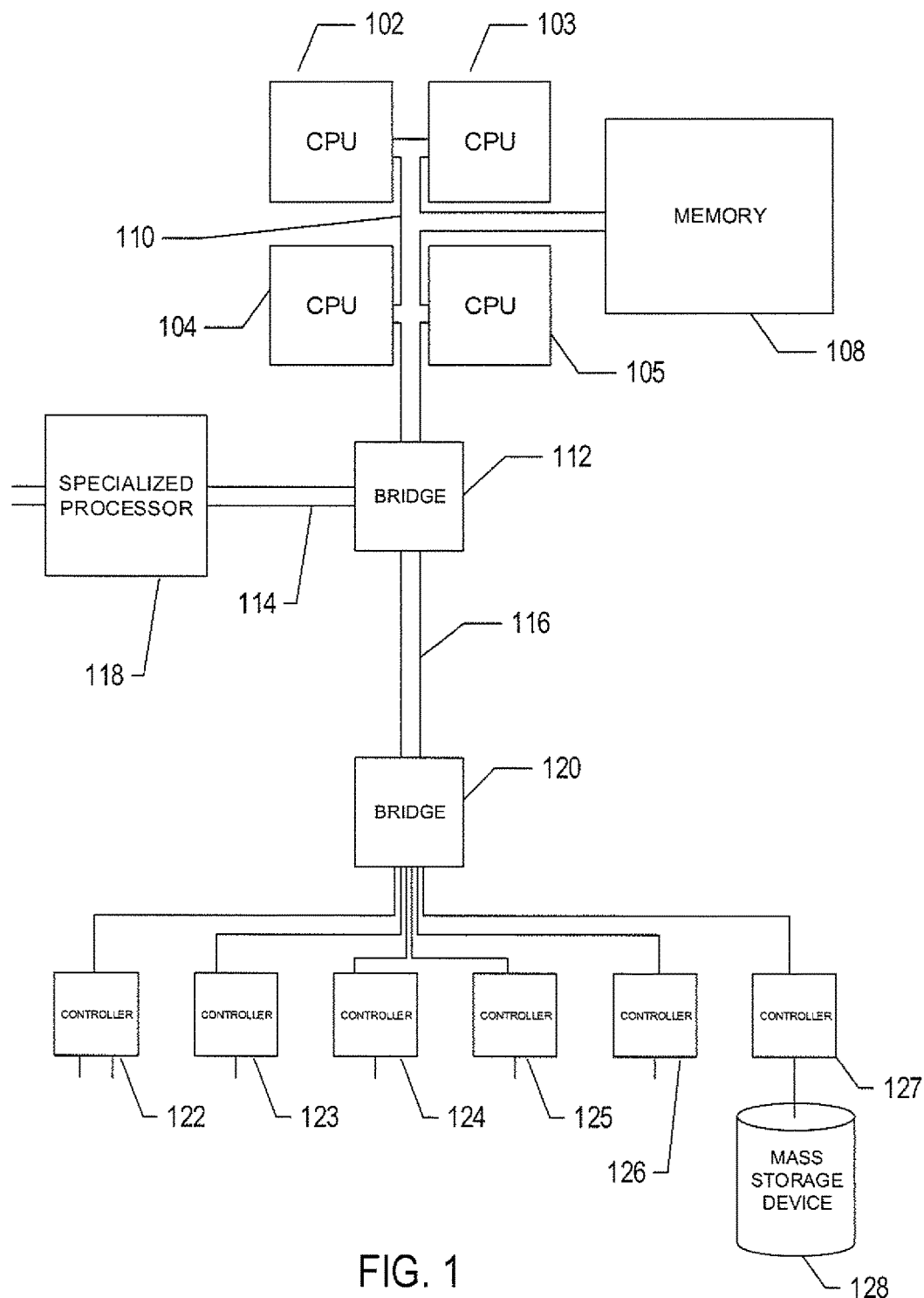
FIG. 1 shows a general architectural diagram for various types of computers.

This disclosure presents computational methods and systems to detect and classify changes in event messages generated by an event source. In a first subsection, computer hardware, complex computational systems, and virtualization are described. Containers and containers supported by virtualization layers are described in a second subsection. Logging event messages in event logs is described in a third subsection. Methods to detect and classify changes in a distributed computing system are described in a fourth subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
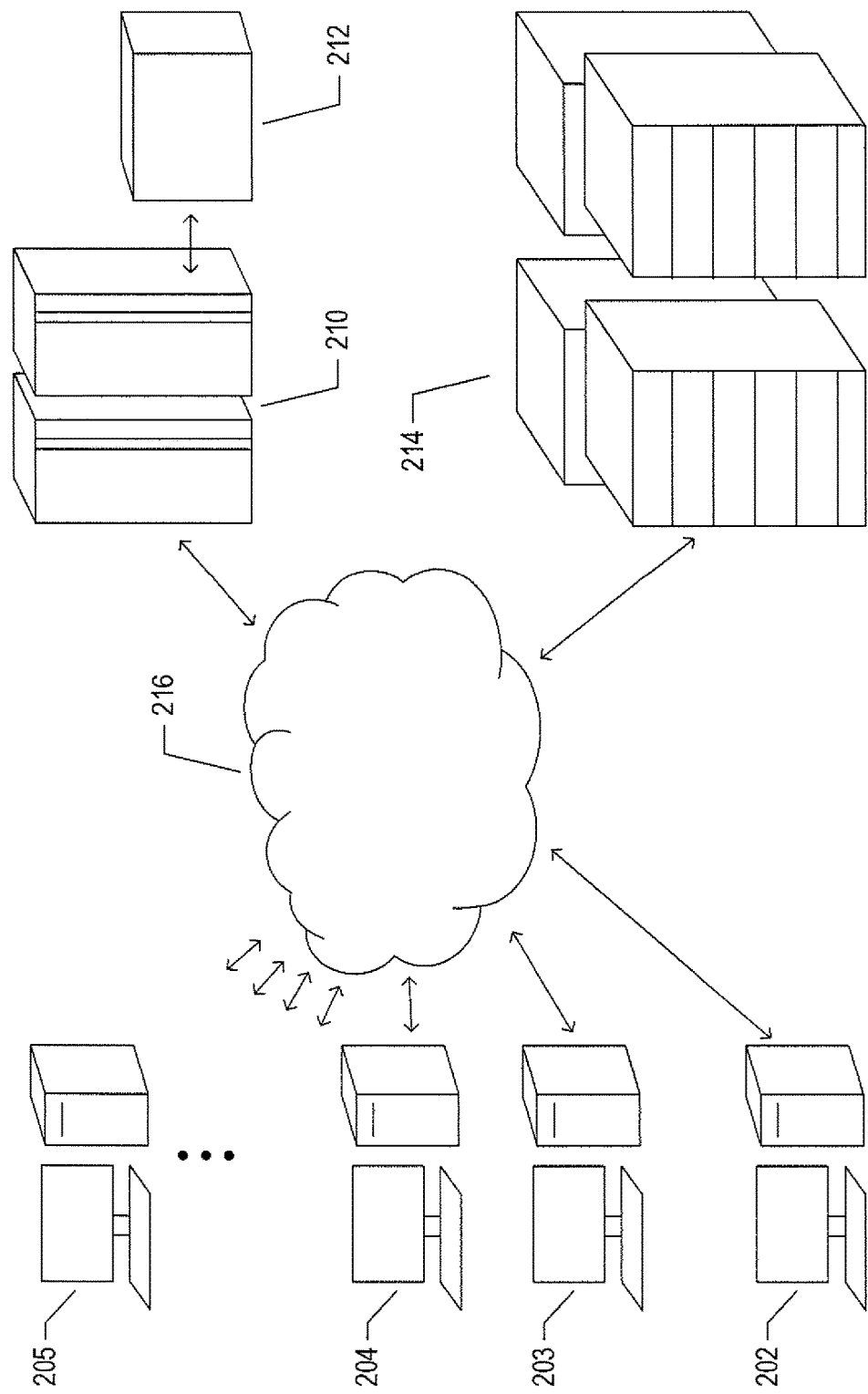
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
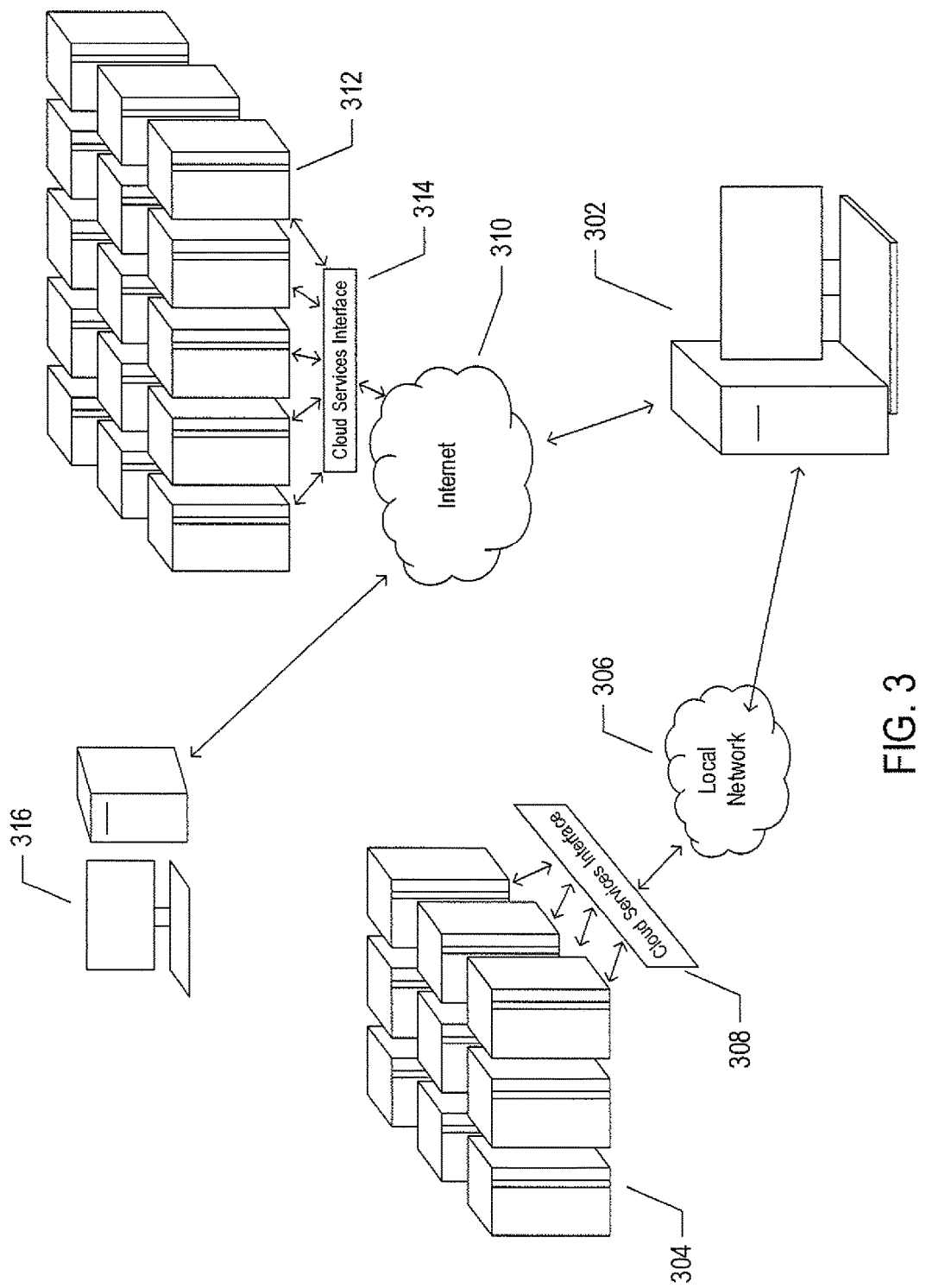
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
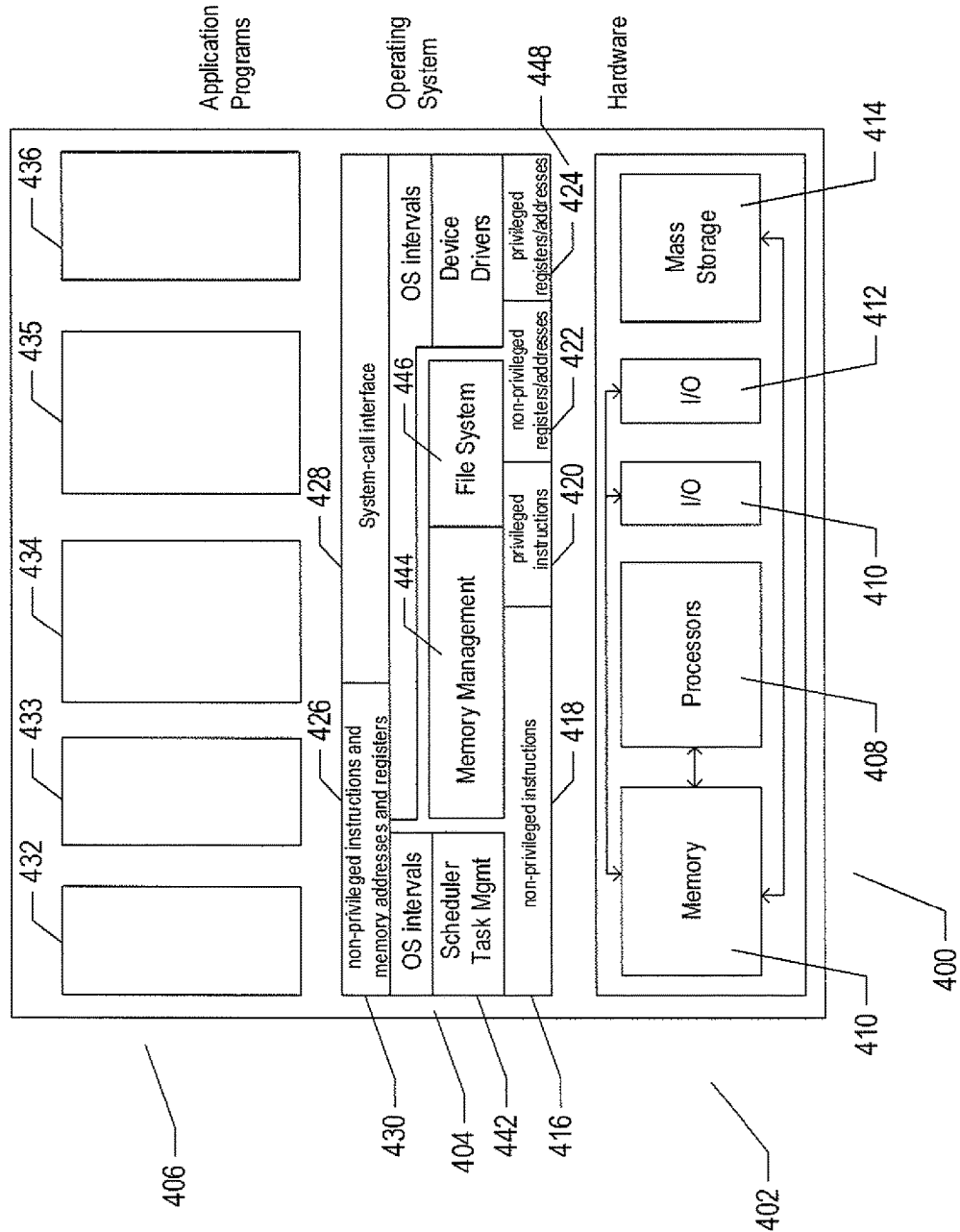
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
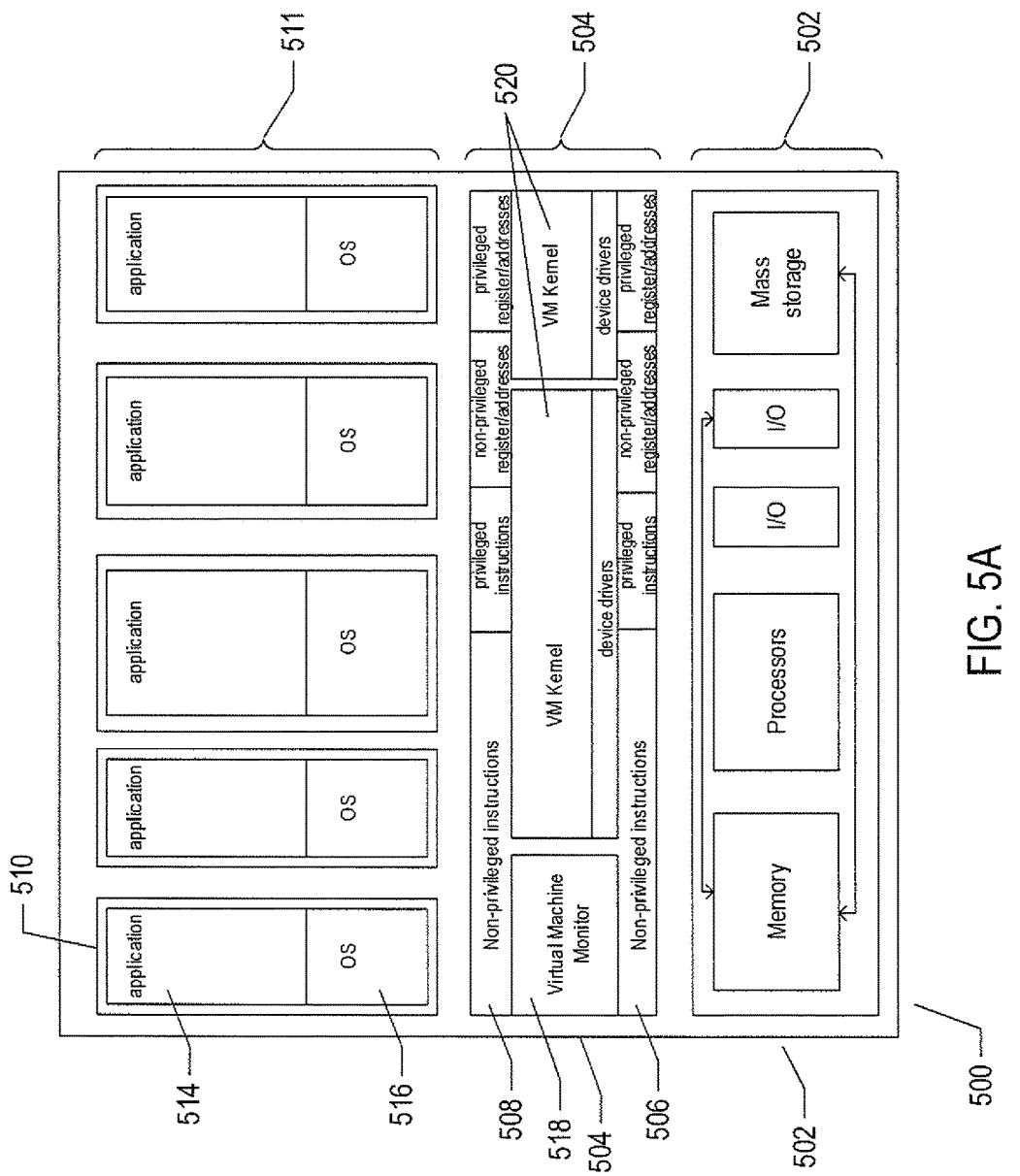
FIGS. 5A-5B show two types of virtual machine ("VM") and VM execution environments.
Figure 5B:
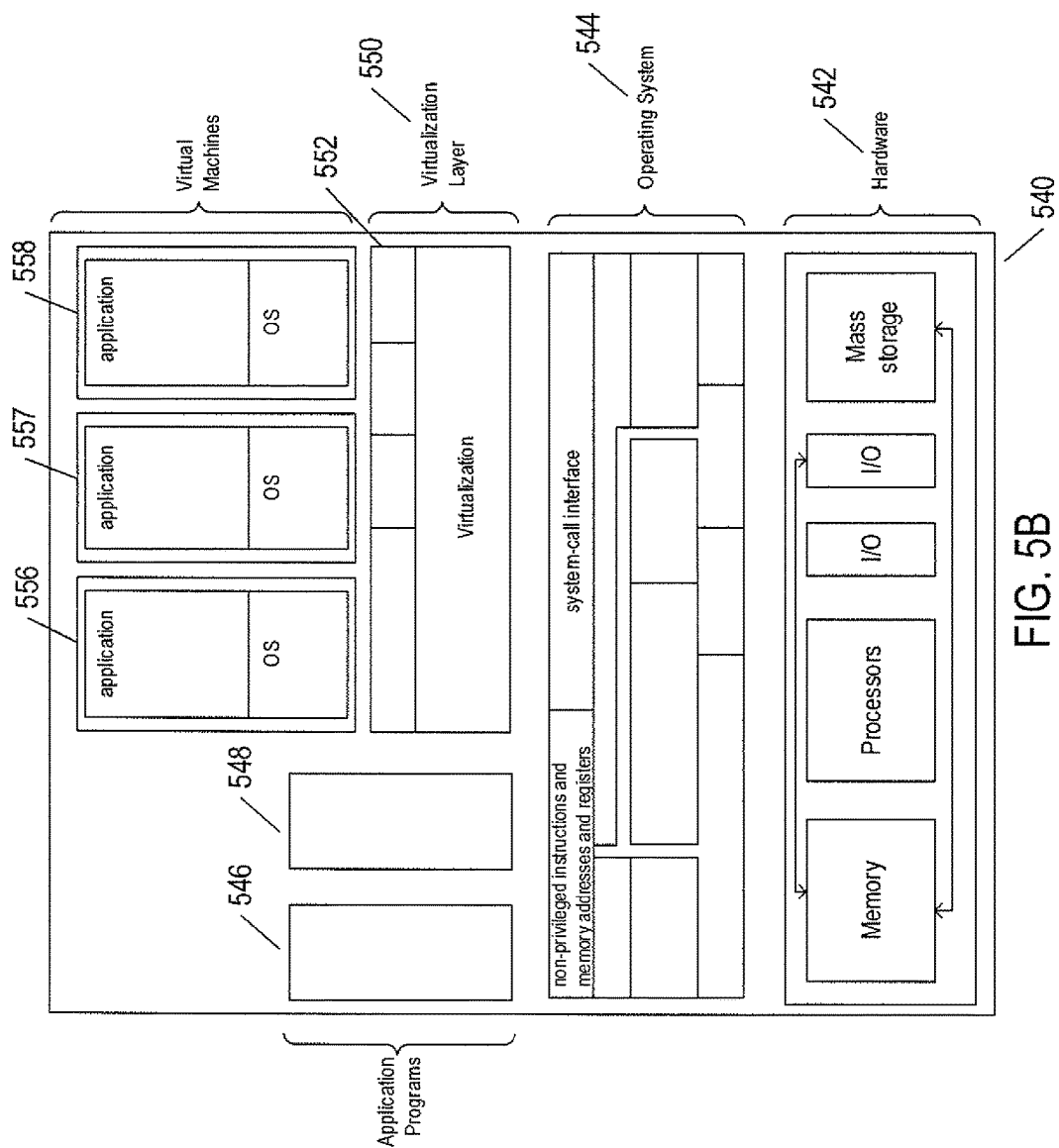

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
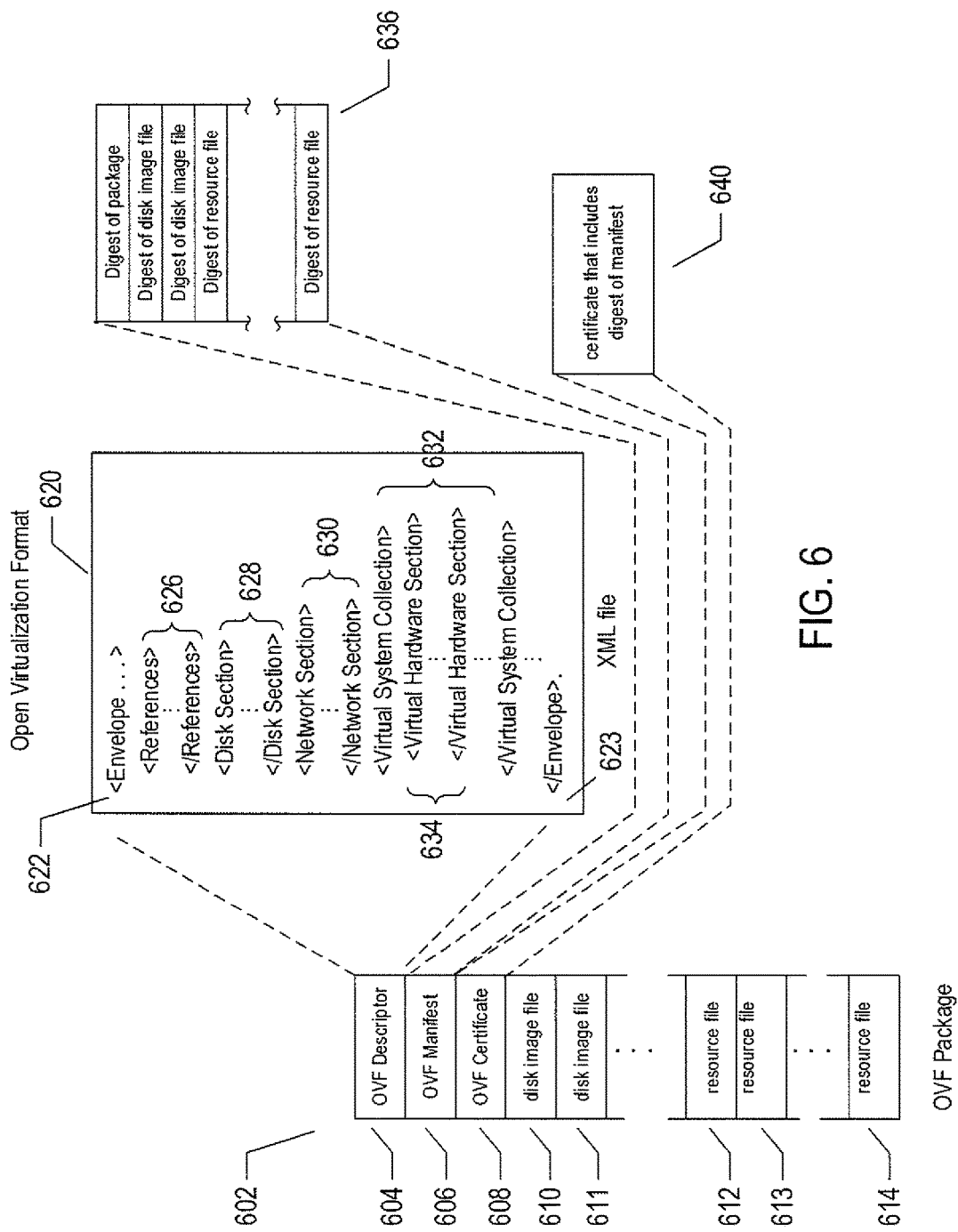
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
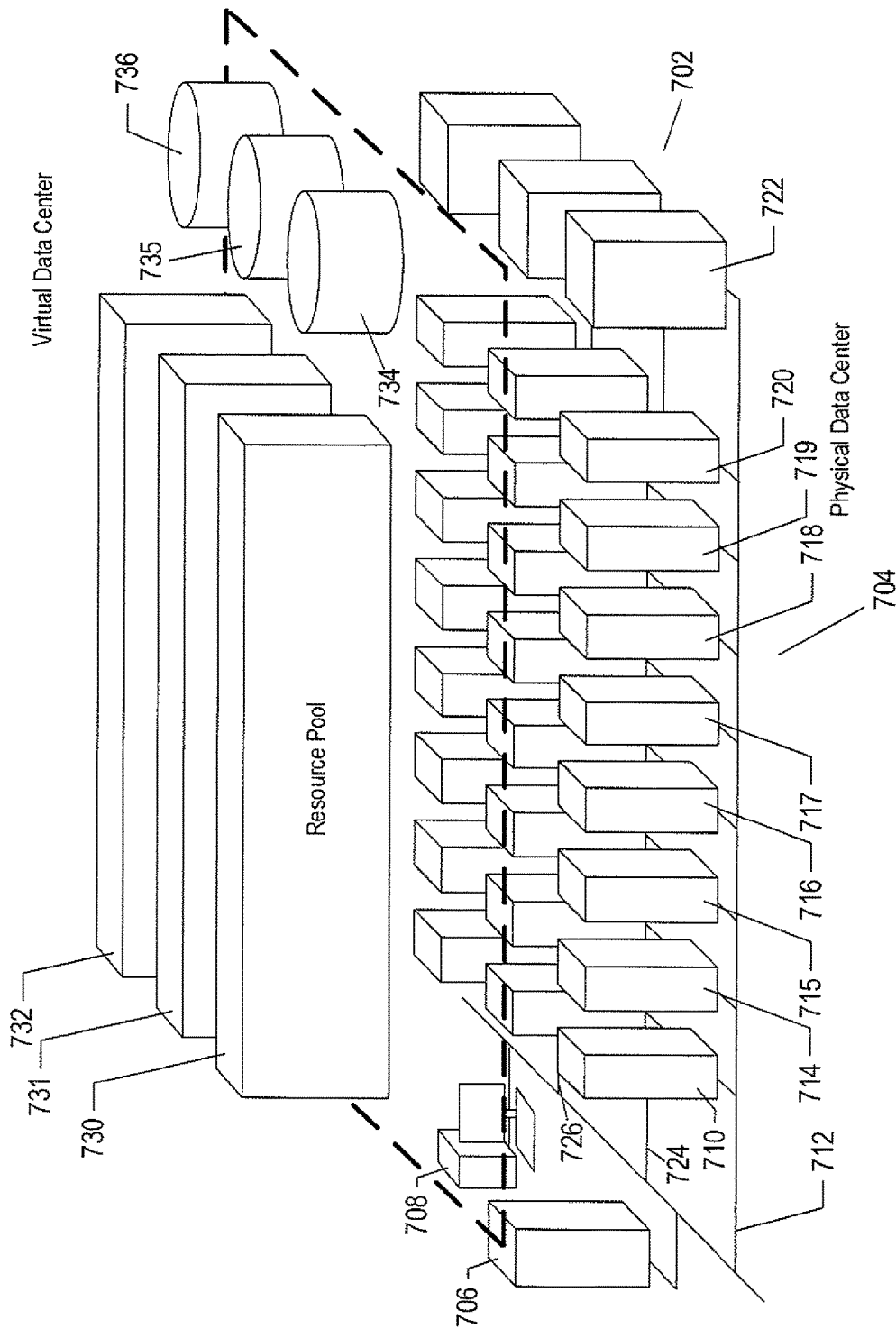
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage allay 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
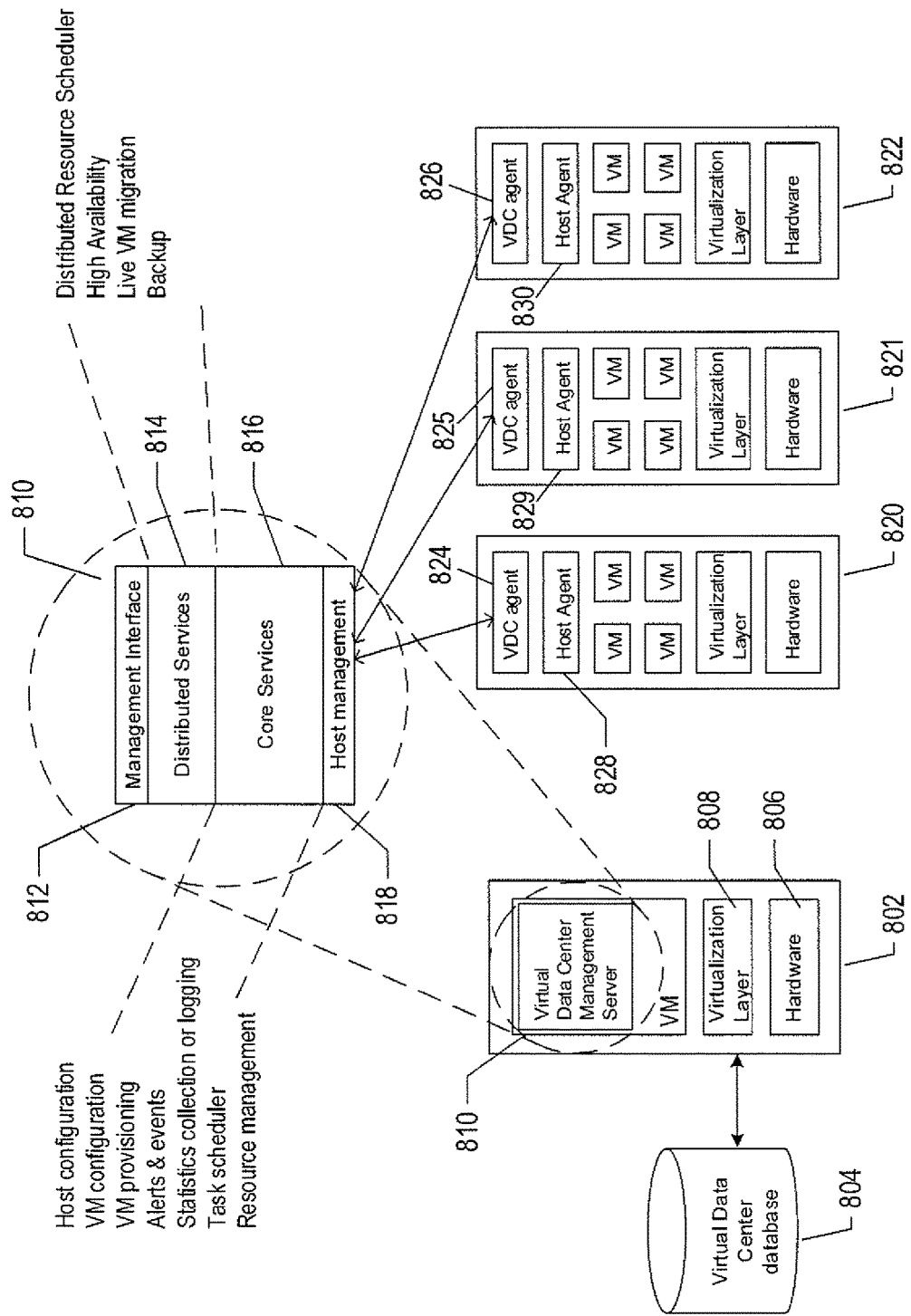
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808, and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
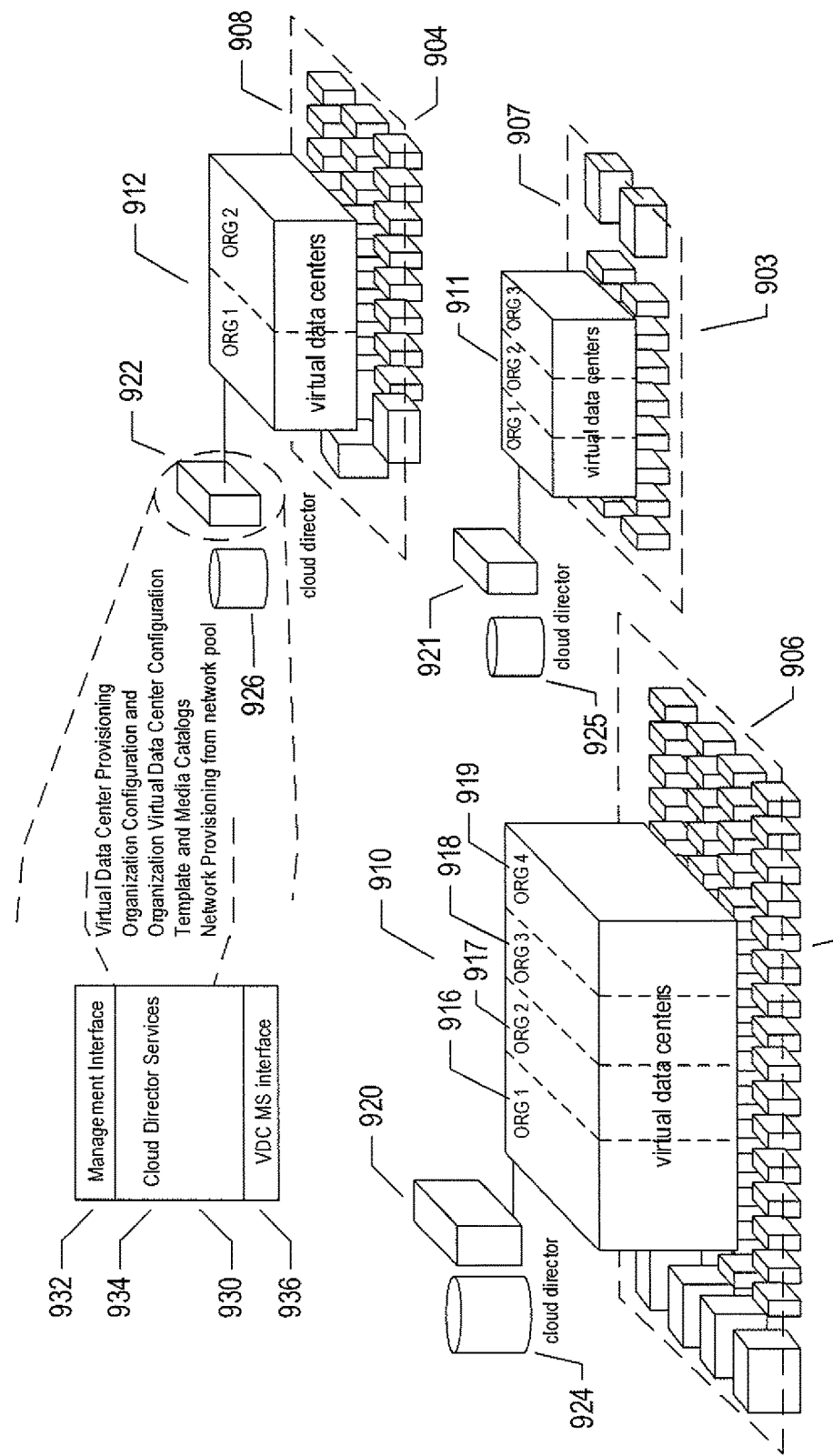
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
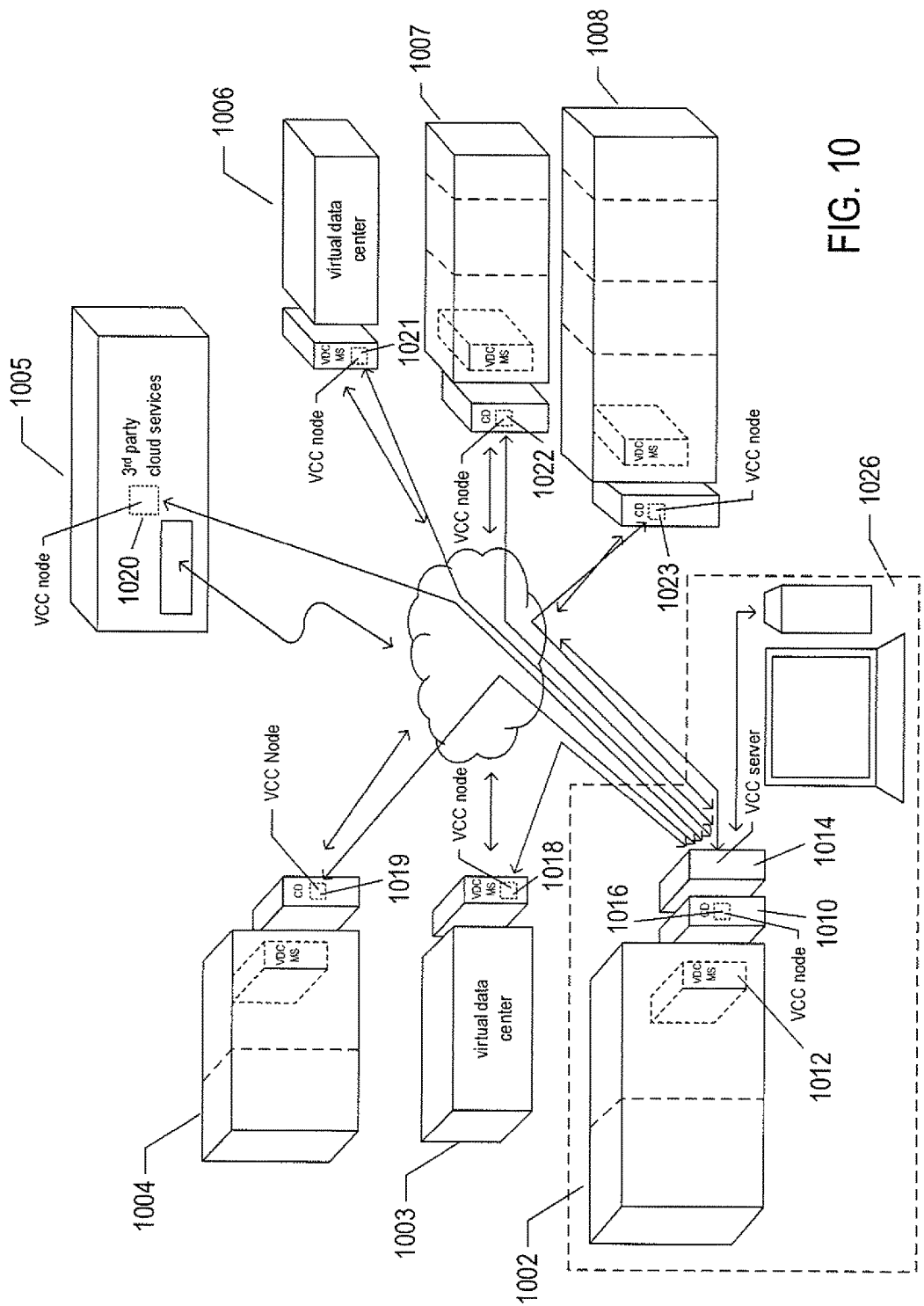
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Containers and Containers Supported by Virtualization Layers

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
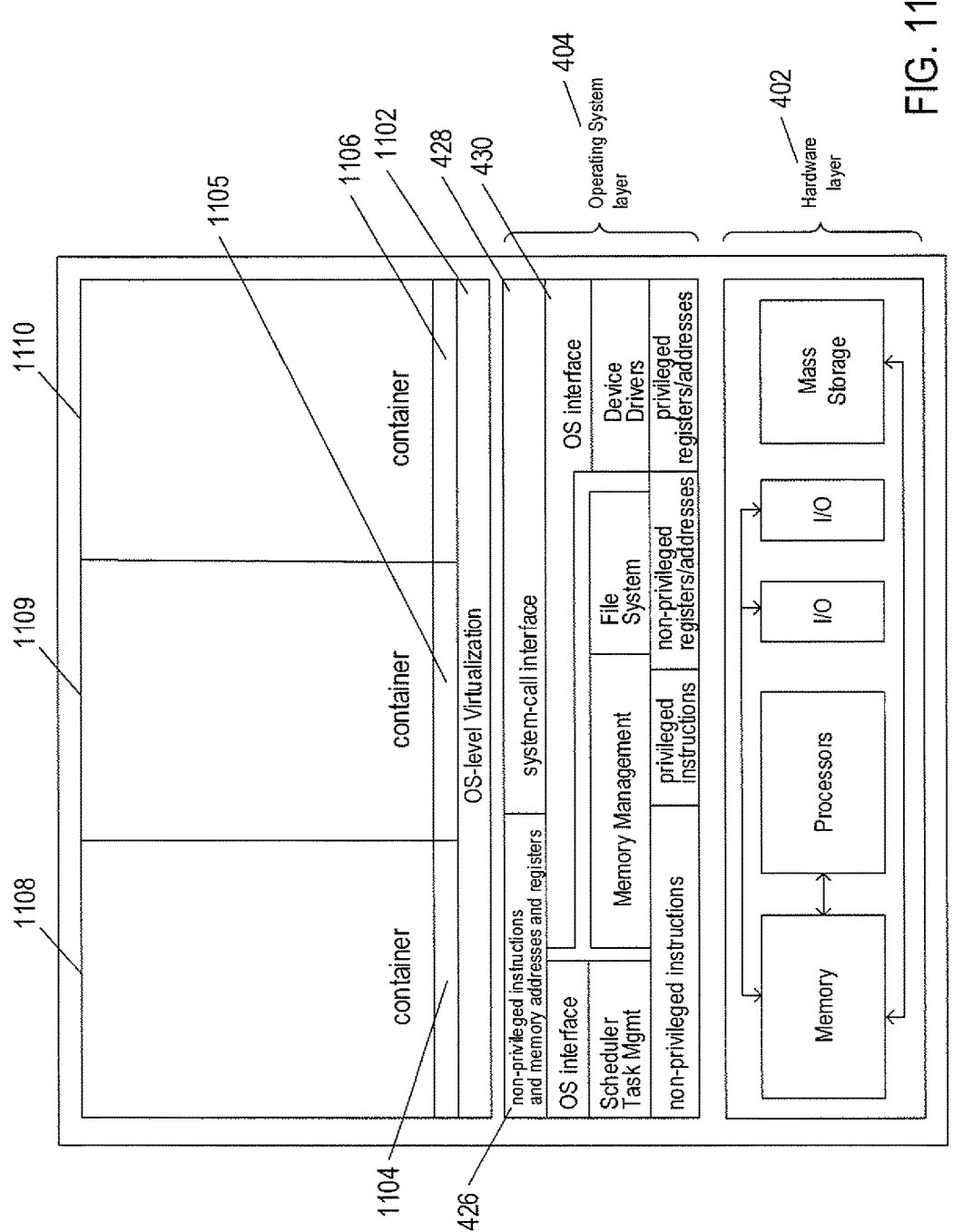
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by thehardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
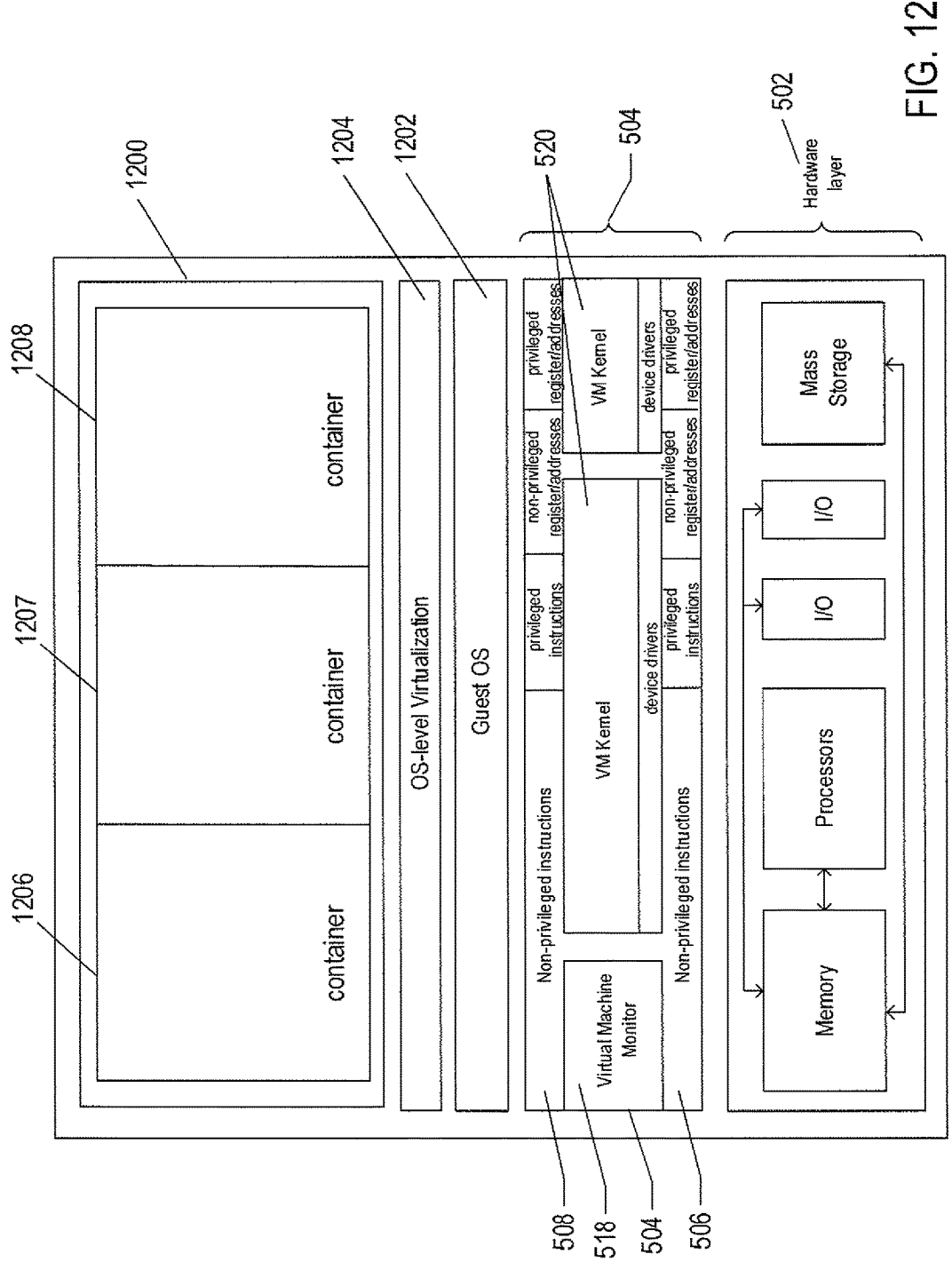
FIG. 12 shows an approach to implementing the containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Logging Event Messages in Event Logs

Figure 13:
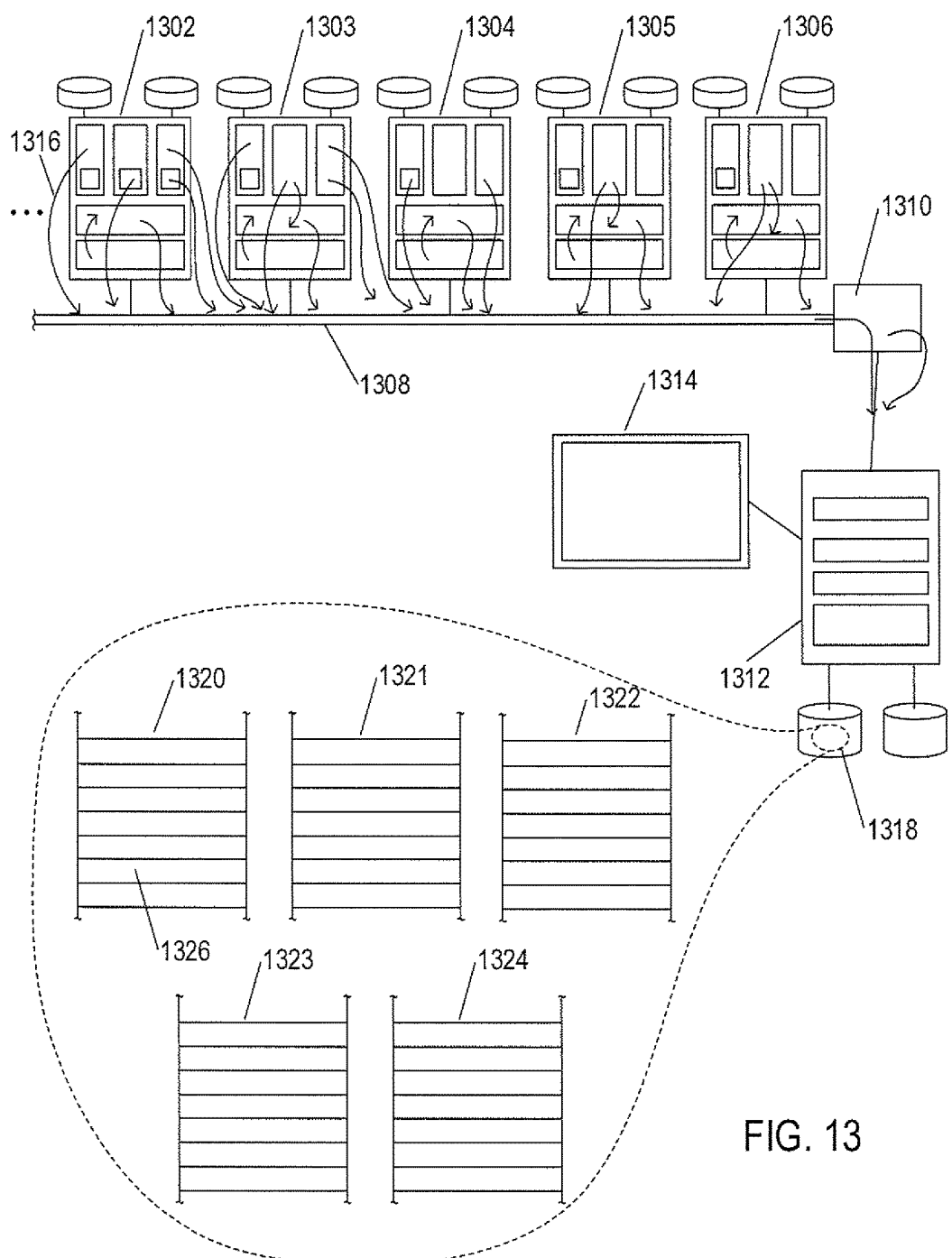
FIG. 13 shows an example of logging event messages in event logs.

FIG. 13 shows an example of logging event messages in event logs. In FIG. 13, a number of computer systems 1302-1306 within a distributed computing system are linked together by an electronic communications medium 1308 and additionally linked through a communications bridge/router 1310 to an administration computer system 1312 that includes an administrative console 1314. As indicated by curved arrows, such as curved arrow 1316, multiple components within each of the discrete computer systems 1302-1306 as well as the communications bridge/router 1310 generate event messages that are transmitted to and ingested by the administration computer 1312. Event messages may be generated by any event source. Event sources may be, but are not limited to, application programs, operating systems, VMs, guest operating systems, containers, network devices, machine codes, event channels, and other computer programs or processes running on the computer systems 1302-1306, the bridge/router 1310 and any other components of the distributed computing system. Event messages may be relatively directly transmitted from a component within a discrete computer system to the administration computer 1312 or may be collected at various hierarchical levels within a discrete computer system and then forwarded from an event-message-collecting entity within the discrete computer system to the administration computer 1312. The administration computer 1312 collects and may store the received event messages in a data-storage device or appliance 1318 as event logs 1320-1324. Rectangles, such as rectangle 1326, represent individual event messages. For example, event log 1320 may comprise a list of event messages generated within the computer system 1302.

Figure 14:
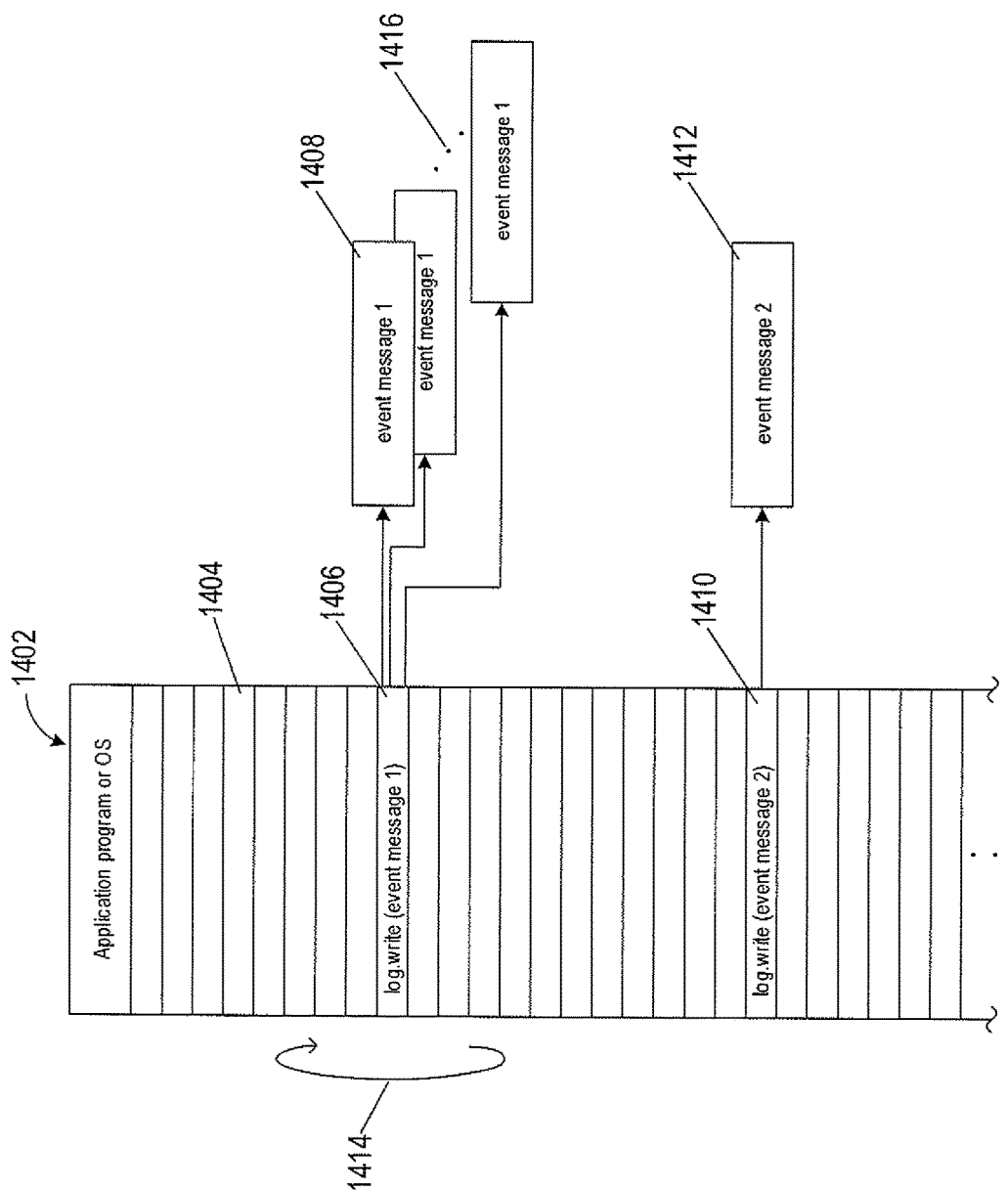
FIG. 14 shows an example of a source code with log write instructions.

FIG. 14 shows an example of a source code 1402 of an application program, an operating system, a VM, a guest operating system, or any other computer program or machine code. The source code 1402 is just one example of an event source that generates event messages. Rectangles, such as rectangle 1404, represent a definition, a comment, a statement, or a computer instruction that expresses some action to be executed by a computer. The source code 1402 includes log write instructions that generate event messages when certain events predetermined by the developer occur during execution of the source code 1402. For example, source code 1402 includes an example log write instruction 1406 that when executed generates an "event message 1" represented by rectangle 1408, and a second example log write instruction 1410 that when executed generates "event message 2" represented by rectangle 1412. In the example of FIG. 14, the log write instruction 1408 is embedded within a set of computer instructions that are repeatedly executed in a loop 1414. As shown in FIG. 14, the same event message 1 is repeatedly generated 1416. The same type of log write instructions may also be located in different places throughout the source code, which in turns creates repeats of essentially the same type of event message in the event log.

In FIG. 14, the notation "log.write( )" is a general representation of a log write instruction. In practice, the form of the log write instruction varies for different programming languages. In general, event messages are relatively cryptic, including generally only one or two natural-language words and/or phrases as well as various types of text strings that represent file names, path names, and, perhaps various alphanumeric parameters. In practice, a log write instruction may also include the name of the source of the event message (e.g., name of the application program or operating system and version) and the name of the event log to which the event message is written. Log write instructions may be written in a source code by the developer of an application program or operating system in order to record events that occur while an operating system or application program is running. For example, a developer may include log write instructions that are executed when certain events occur, such as failures, logins, or errors.

FIG. 15 shows an example of a log write instruction 1502. In the example of FIG. 15, the log write instruction 1502 includes arguments identified with "$." For example, the log write instruction 1502 includes a time-stamp argument 1504, a thread number argument 1505, and an internet protocol ("IP") address argument 1506. The example log write instruction 1502 also includes text strings and natural-language words and phrases that identify the type of event that triggered the log write instruction, such as "Repair session" 1508. The text strings between brackets "[ ]" represent file-system paths, such as path 1510. When the log write instruction 1502 is executed, parameters are assigned to the arguments and the text strings and natural-language words and phrases are stored as an event message in an event log.

FIG. 16 shows an example of an event message 1602 generated by the log write instruction 1502. The arguments of the log write instruction 1502 may be assigned numerical parameters that are recorded in the event message 1602 at the time the event message is written to the event log. For example, the time stamp 1504, thread 1505, and IP address 1506 of the log write instruction 1502 are assigned corresponding numerical parameters 1604-1606 in the event message 1602. The time stamp 1604, in particular, represents the date and time the event message is generated. The text strings and natural-language words and phrases of the log write instruction 1502 also appear unchanged in the event message 1602 and may be used to identify the type of event that occurred during execution of the application program or operating system.

As event messages are received from various event sources, the event messages are stored in the order in which the event messages are received. FIG. 17 shows a small, eight-entry portion of an event log 1702. In FIG. 17, each rectangular cell, such as rectangular cell 1704, of the portion of the event log 1702 represents a single stored event message. For example, event message 1702 includes a short natural-language phrase 1706, date 1708 and time 1710 numerical parameters, as well as, a numerical parameter 1712 that appears to identify a particular host computer.

Methods to Detect and Classify Changes in a Distributed Computing System

Unexpected behavior detected in a distributed computing system may be categorized as an anomaly or a change. An anomaly is an extreme event of a random process that has essentially the same overall characteristics in the present as in the past. On the other hand, a change is an alteration in the characteristics and distribution of the random process itself. A change point is a point in time when the behavior of an event source starts to differ significantly from past behavior. System administrators typically rely on IT management tools to monitor objects of a distributed computing system. An object may be, but is not limited to, a computer system, server computer, VM, or a container. Each object has associated time-series metric data that is used to measure the performance of the object. IT management tools detect anomalies by applying dynamic threshold analytics to the metric data and report any threshold violations. However, changes in the behavior of objects may be attributed to other causes, including hitting a new software bug, hardware failure, software upgrade, configuration changes, or changes in workload. Identifying such changes are important in managing objects of a distributed computing system, but IT management tools are not able to detect and classify a point in time when such changes occur. Methods described herein are directed to automatically detecting and classifying changes in a distributed computing system based on event messages generated by various event sources running in objects of a distributed computing system.

Figure 18:
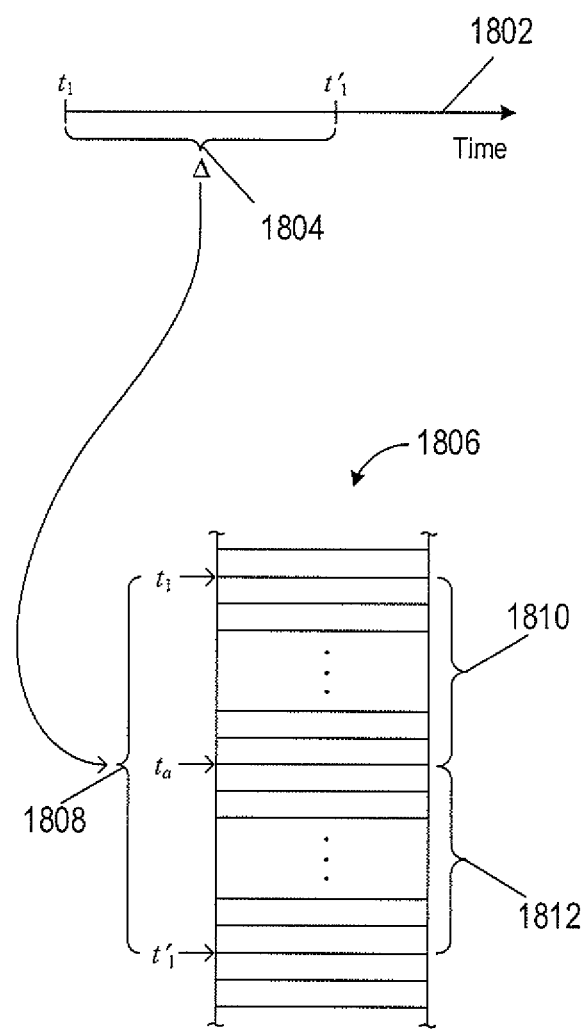
FIG. 18 shows event messages generated by an event source.

FIG. 18 shows event messages generated by an event source. FIG. 18 includes a time axis 1802 and a time window 1804 of length $\Delta$ located at a time interval $[t_1, t'_1]$ defined by a lower bound $t_1$ and upper bound $t'_1$, where $t'_1 = t_1 + \Delta$ and the subscript 1 is a first measurement index. The length $\Delta$ of the time interval $[t_1, t'_1]$ is large enough to collect a sufficient number of event messages. For example, the length $\Delta$ of the time window may be 5 minutes, 10 minutes, 15 minutes, 20 minutes, or more than 20 minutes. FIG. 18 also shows a portion of an event log 1806 with rectangles that represent event messages. Event messages 1808 have time stamps that lie within the time interval $[t_1, t'_1]$. The time interval $[t_1, t'_1]$ is divided into two equal length sub-time intervals $[t_1, t_a]$ and $[t_a, t'_1]$, where $t_a = (t'_1 - t_1)/2$. The event messages 1808 are divided into two sets of event messages. A first set of event messages 1810 has time stamps in the first time interval $[t_1, t_a]$. A second set of event messages 1812 has time stamps in the second time interval $[t_a, t'_1]$.

Figure 19:
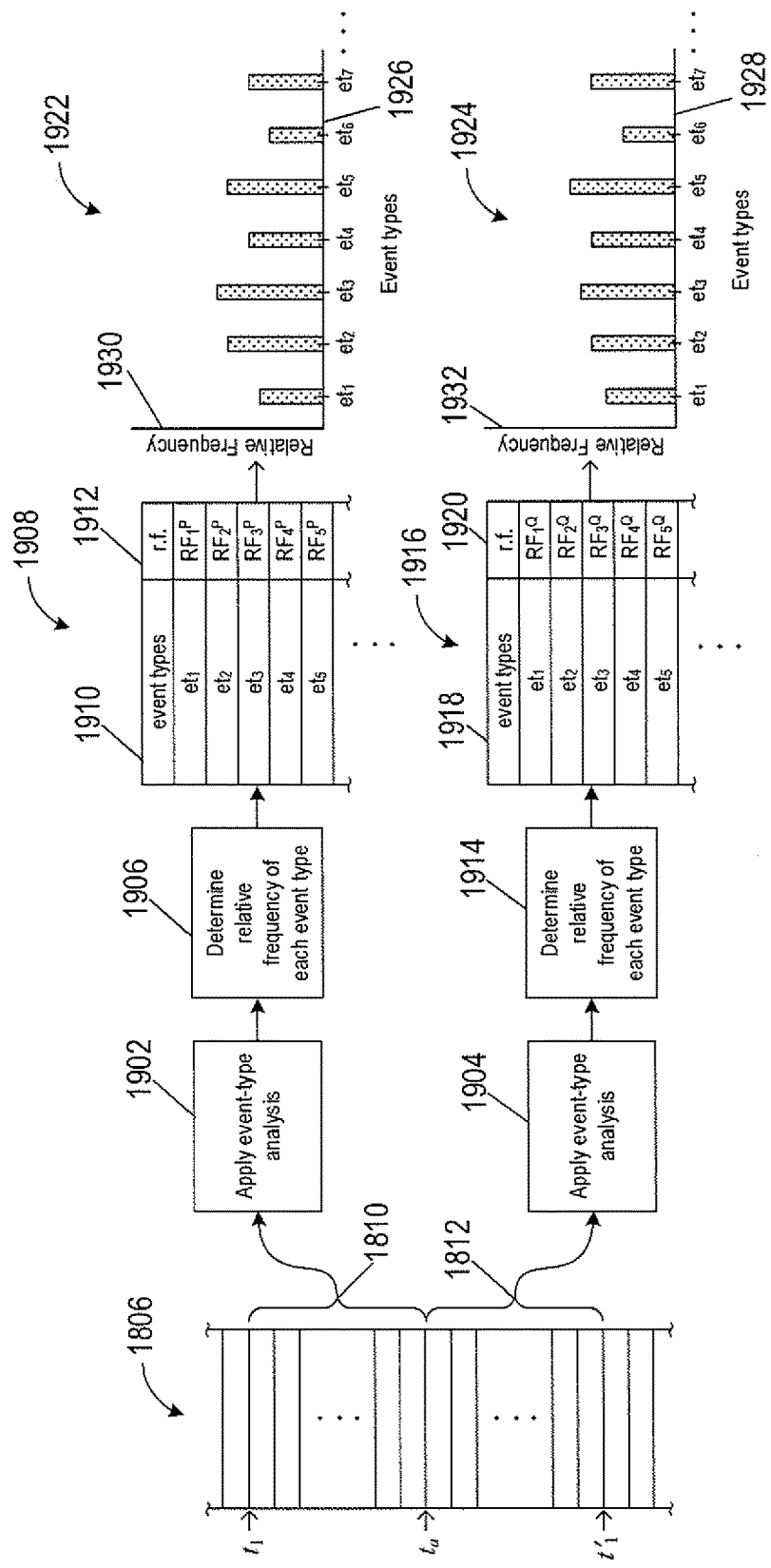
FIG. 19 shows determination of separate event-type distributions for first and second sequences of event messages in FIG. 18.

Separate event-type distributions are computed for the first and second sets of event messages. FIG. 19 shows determination of separate event-type distributions for the first and second sets of event messages 1810 and 1812 in FIG. 18. In block 1902, event-type analysis is applied to each event message of the first set of event messages 1810 to determine the event type of each event message in the first set of event messages 1810. In block 1904, event-type analysis is applied to each event message of the second set of event messages 1812 to determine the event type of each event message in the second set of event messages 1812. Event-type analysis reduces the event message to text strings and natural-language words and phrases (i.e., non-parametric tokens).

Figure 20:
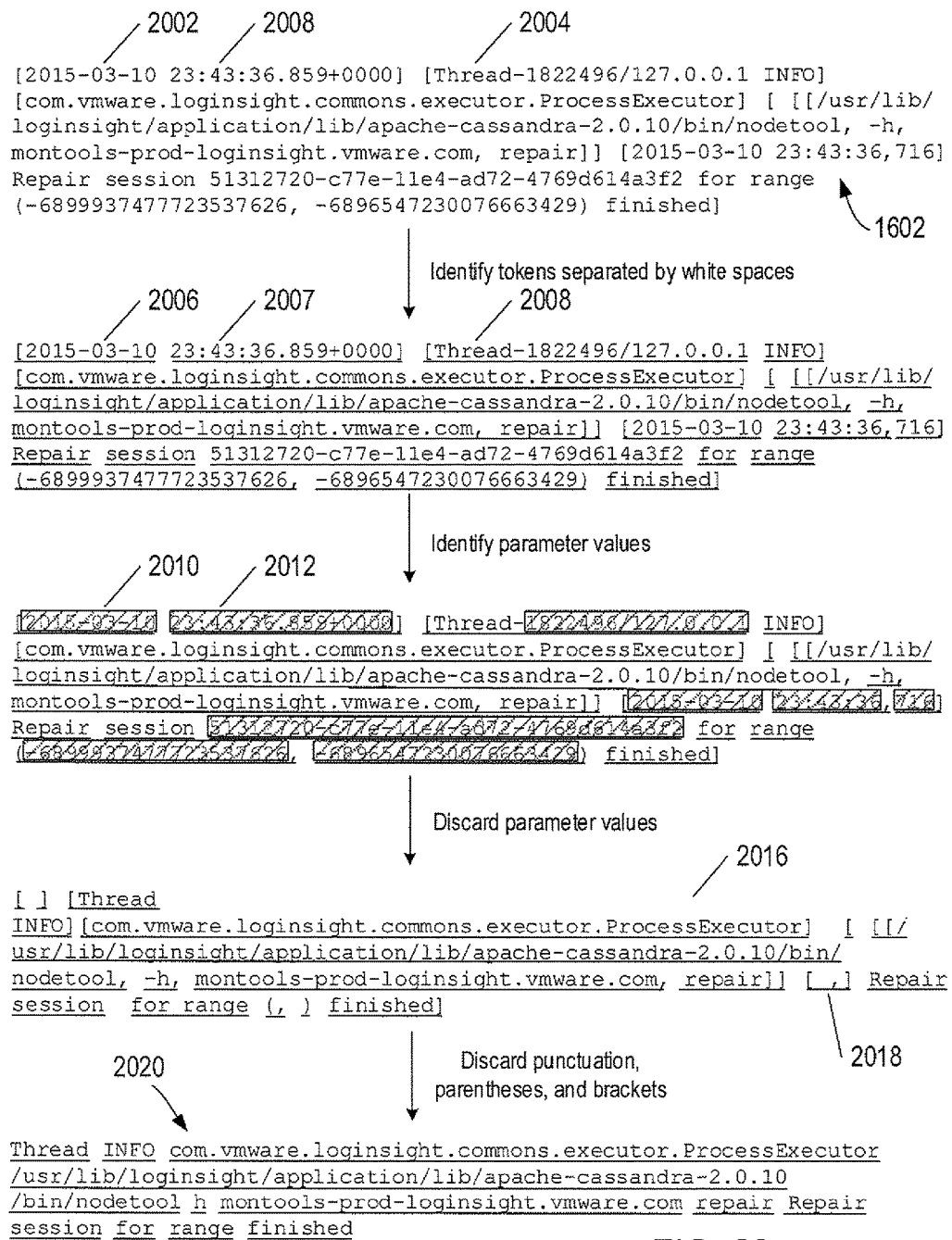
FIG. 20 shows an example of event-type analysis performed on an event message.

FIG. 20 shows an example of event-type analysis performed on the event message 1602 shown in FIG. 16. The event message 1602 is first tokenized by considering the event message as comprising tokens separated by non-printed characters, referred to as "white space." In FIG. 20, this initial tokenization of the event message 1602 is illustrated by underlining of the printed or visible characters. For example, the date 2002, time 2003, and thread 2004 at the beginning of the text contents of the event message 2002, following initial tokenization, become a first token 2006, a second token 2007, and a third token 2008, as indicated by underlining. Next, a token-recognition pass is made to recognize any of the initial tokens as various types of parameters. Parameters are tokens or message fields that are likely to be highly variable over a set of messages of a particular type. Date/time stamps, for example, are nearly unique for each event message, with two event messages having an identical date/time stamp only in the case that the two event messages are generated within less than a second of one another. Additional examples of parameters include global unique identifiers ("GUIDs"), hypertext transfer protocol status values ("HTTP statuses"), universal resource locators ("URLs"), network addresses, and other types of common information entities that identify variable aspects of an event type. By contrast, the phrase "Repair session" in event message 1602 likely occurs within each of a large number of repair session event messages. In FIG. 20, the parametric-valued tokens in the event message following initial token recognition are indicated by shading. For example, initial token recognition determines that the first token 2006 is a date and the second token 2007 is a time. The tokens identified as parameters are identified by shaded rectangles, such as shaded rectangle 2010 of the date 2006 and shaded rectangle of 2012 of the time 2007. The parametric-valued tokens are discarded leaving the non-parametric text strings, natural language words and phrases, punctuation, parentheses, and brackets. Various types of symbolically encoded values, including dates, times, machine addresses, network addresses, and other such parameters can be recognized using regular expressions or programmatically. For example, there are numerous ways to represent dates. A program or a set of regular expressions can be used to recognize symbolically encoded dates in any of the common formats. It is possible that the token-recognition process may incorrectly determine that an arbitrary alphanumeric string represents some type of symbolically encoded parameter when, in fact, the alphanumeric string only coincidentally has a form that can be interpreted to be a parameter. The currently described methods and systems do not depend on absolute precision and reliability of the event-message-preparation process. Occasional misinterpretations generally do not result in mistyping of event messages and, in the rare circumstances in which event messages may be mistyped, the mistyping is most often discovered during subsequent processing. In the implementation shown in FIG. 20, the event message 2002 is subject to textualization in which an additional token-recognition step of the non-parametric portions of the event message is performed in order to remove punctuation and separation symbols, such as parentheses and brackets, commas, and dashes that occur as separate tokens or that occur at the leading and trailing extremities of previously recognized non-parametric tokens, as shown by underlining in the retokenized event message 2014 in FIG. 20. For example, brackets and a coma 2018 are underlined. The punctuation, parentheses, and brackets are discarded leaving a textualized event message of interest 2020 that comprises only the non-parametric text strings and natural language words and phrases of the original event message 1602. The textualized event message 2020 represents an event type. Other textualized event messages with the same non-parametric text strings and natural language words and phrase as the textualized event messages 2020 are the same event type. Another textualized event message with one or more different non-parametric text strings or natural language words and phrase from those of the textualized event messages 2020 is of a different event type. In the following discussion, the notation $et_l$ represents an event type of one or more event messages, where l is a positive integer event type index.

Returning to FIG. 19, in block 1906, relative frequencies of the event types identified in block 1902 are computed. A relative frequency is computed for each event type of the first set of event messages 1810:

$$RF_l^P = \frac{n_P(et_l)}{N_P} \quad (1a)$$

where $n_P(et_l)$ is the number of times the event type $et_l$ appears in the first set of event messages 1810; and $N_P$ is the total number event messages in the first set of event messages 1810.

A first event type log 1908 is formed from the different event types and associated relative frequencies. The first event-type log 1908 comprises a list of the different event types 1910 in the first set of event messages 1810 and corresponding relative frequencies 1912 of each event type in the first set of event messages 1810. In block 1914, relative frequencies of the event types of the second set of event messages identified in block 1904 are also computed. A relative frequency is computed for each event type of the second set of event messages 1812:

$$RF_l^Q = \frac{n_Q(et_l)}{N_Q} \quad (1b)$$

where $n_Q(et_l)$ is the number of times the event type $et_l$ appears in the second set of event messages 1812; and $N_Q$ is the total number event messages in the second set of event messages 1812.

A second event type log 1916 is formed from the different event types and associated relative frequencies. The second event-type log 1916 comprises a list of the different event types 1918 in the second set of event messages 1812 and corresponding relative frequencies 1920 of each event type in the second set of event messages 1812. The relative frequencies 1912 and 1920 of the various event types are event-type distributions.

FIG. 19 shows a plot of a first event-type distribution 1922 of the relative frequencies 1912 and a plot of a second event-type distribution 1924 of the relative frequencies 1920. Horizontal axes 1926 and 1928 represent the various event types. Vertical axes 1930 and 1932 represent relative frequency ranges. Shaded bars represent the relative frequency of each event type. In the example of FIG. 19, the first event-type distribution 1922 and the second event-type distribution 1924 display differences in the relative frequencies of certain event types. For example, the relative frequency of the event type $et_1$ is same in the first and second sub-time intervals. By contrast, the relative frequency of the event type $et_3$ is smaller in the second sub-time interval than in the first sub-time interval.

A divergence value between first and second event-type distributions for a time interval is computed using any one of various different methods. The divergence value is a quantitative measure of a change to the object based on event messages generated in the first and second time intervals. In one implementation, a divergence value between first and second event-type distributions of a time interval may be computed using the Jensen-Shannon divergence:

$$D_i = -\sum_{l=1}^{L} M_l \log M_l + \frac{1}{2}\left[\sum_{l=1}^{L} P_l \log P_l + \sum_{l=1}^{L} Q_l \log Q_l\right] \quad (2)$$

where the subscript "i" represents a measurement index;
$P_l = RF_l^P$;
$Q_l = RF_l^Q$;
$M_l = (P_l + Q_l)/2$; and
L is the number of event types.

In another implementation, the divergence value may be computed using an inverse cosine as follows:

$$D_i = 1 - \frac{2}{\pi}\cos^{-1}\left[\frac{\sum_{l=1}^{L} P_l Q_l}{\sqrt{\sum_{l=1}^{L} (P_l)^2} \sqrt{\sum_{k=1}^{L} (Q_l)^2}}\right] \quad (3)$$

The divergence value $D_i$ computed according to Equation (2) or (3) satisfies the following condition $$0 \leq D_i \leq 1 \quad (4)$$

The divergence value is a normalized value that is used to measure how much, or to what degree, the first event-type distribution differs from the second event-type distribution. The closer the divergence is to zero, the closer the first event-type distribution is to the second event-type distribution. For example, when $D_i=0$, the first event-type distribution is identical to the second event-type distribution. On the other hand, the closer the divergence is to one, the farther the first event-type distribution is from the second event-type distribution. For example, when $D_i=1$, the first and second event-type distributions have no event types in common.

Figure 21:
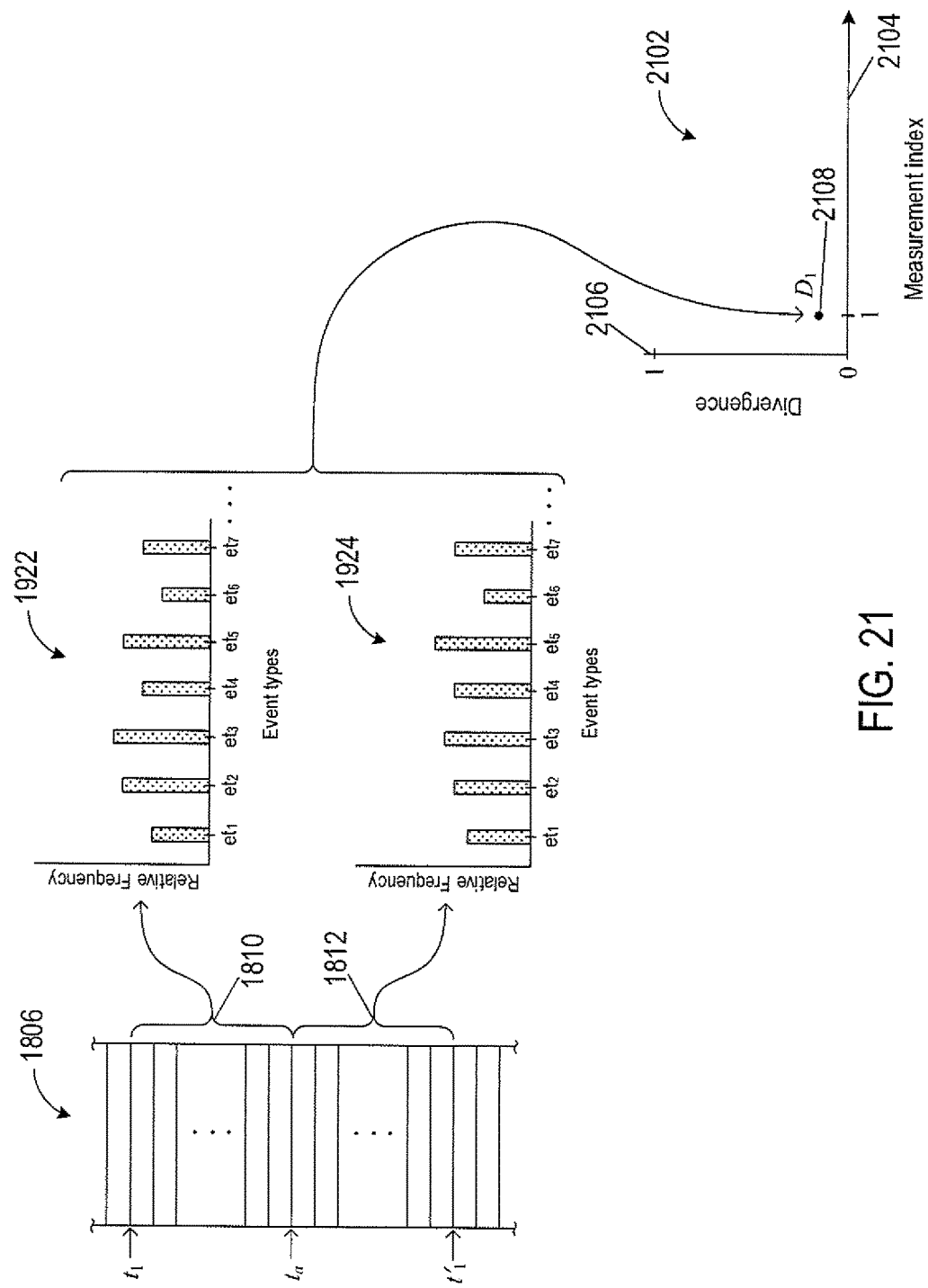
FIG. 21 shows a plot of an example divergence value computed for first and second event-type distributions.

FIG. 21 shows a plot 2102 of an example divergence computed for the first event-type distribution 1922 and the second event-type distribution 1924 shown FIG. 19. Horizontal axis 2104 represents measurement indices. Vertical axis 2106 represents the divergence. Dot 2108 represents the example divergence computed for the first event-type distribution 1922 and the second event-type distribution 1924. Note that the divergence value is close to zero, which indicates the distributions 1922 and 1924 are similar.

The time window is then moved or slides to a next time interval $[t_2, t'_2]$ by a time step denoted by $\delta$. The time step is less than the length of the time window $\Delta$ (i.e., $\delta<\Delta$). For example, the time step may be 30 seconds, 1 minute, 2 minutes, 5 minutes, or of any suitable duration that is less than the length of the time window. As a result, the time interval $[t_2, t'_2]$ overlaps the previous time interval $[t_1, t'_1]$.

Figure 22:
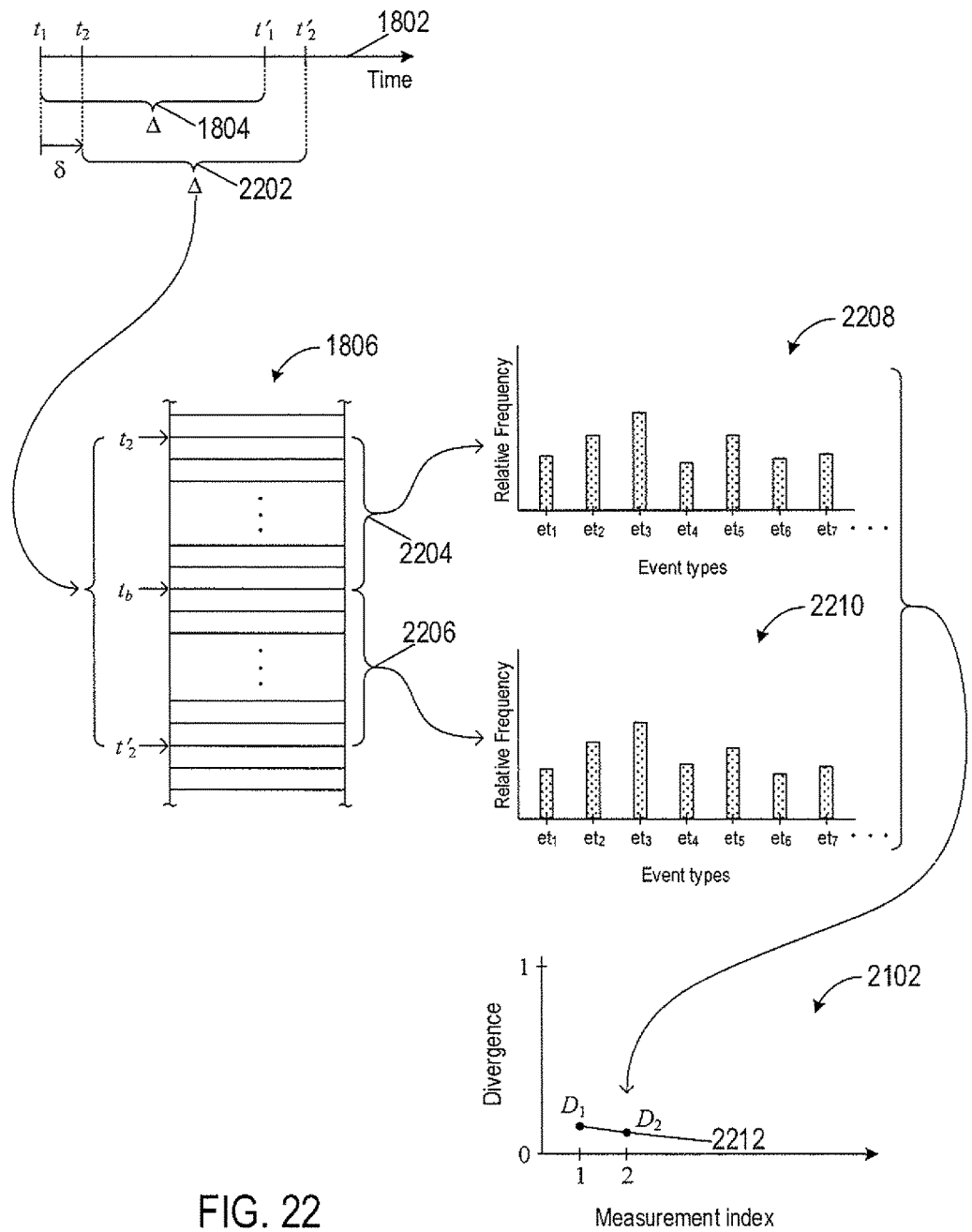
FIGS. 22-23 show examples of computing divergence values event messages in overlapping time intervals.

FIG. 22 shows an example of a time window 2202 located at a time interval $[t_2, t'_2]$, where the subscript 2 is a second measurement index. The time interval $[t_2, t'_2]$ overlaps the previous time interval $[t_1, t'_1]$. Event messages with time stamps in the time interval $[t_2, t'_2]$ are identified in the event log 1806. The time interval $[t_2, t'_2]$ is divided into two equal length sub-time intervals $[t_2, t_b]$ and $[t_b, t'_2]$, where $t_b=(t'_2-t_2)/2$. A first set of event messages 2204 with time stamps in the first sub-time interval $[t_2, t_b]$ are identified. A second set of event messages 2206 with time stamps in the second sub-time interval $[t_b, t'_2]$ are identified. A first event-type distribution 2208 is computed from the first set of event messages 2204 and a second event-type distribution 2210 is computed from the second set of event messages 2206 as described above with reference to FIG. 19. A second divergence value $D_2$ 2212 is computed for the first and second event-type distributions 2208 and 2210 according to Equation (2) or (3).

Figure 23:
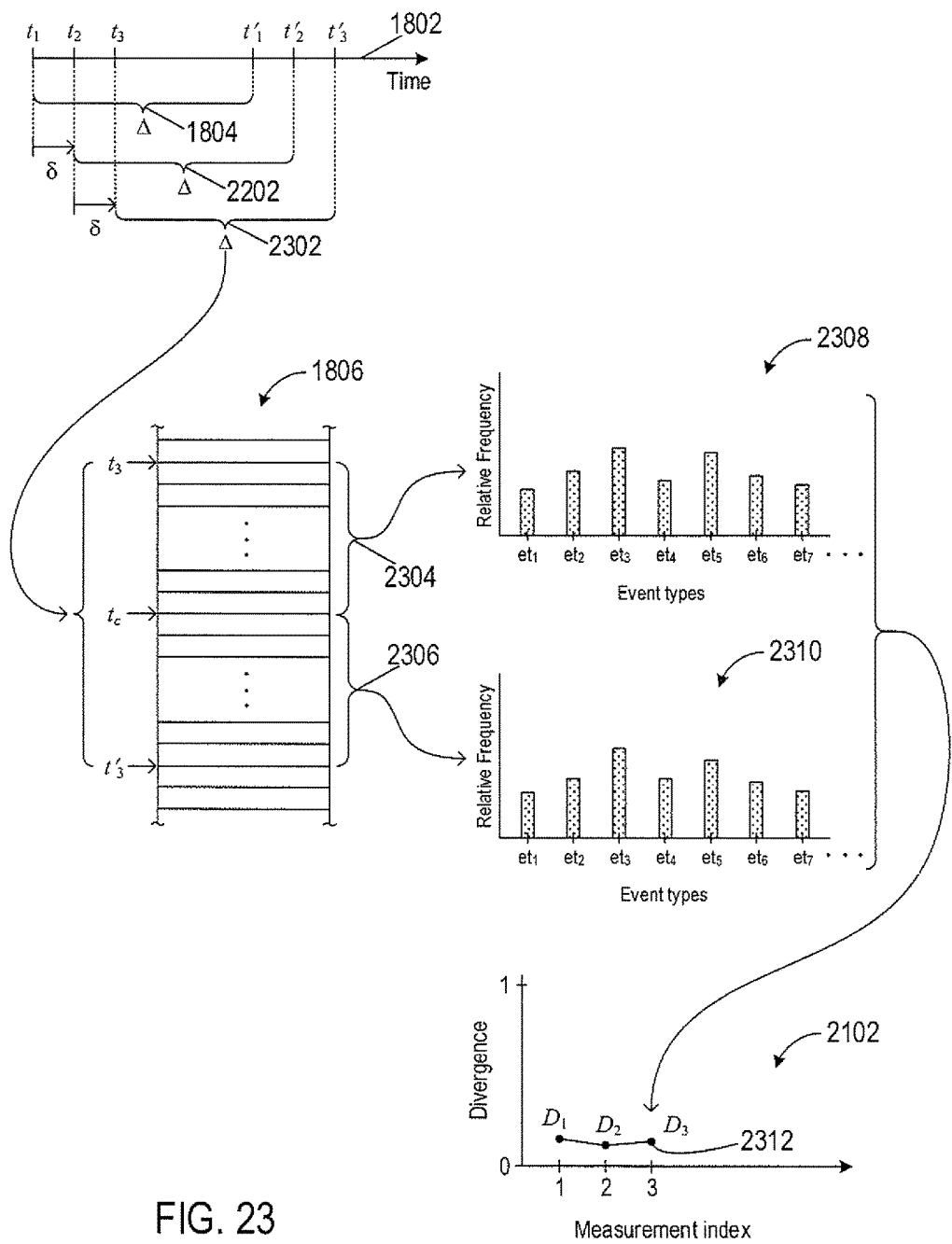

FIG. 23 shows an example of a time window 2302 that overlaps the previous time window 2202, where the subscript 3 is a third measurement index. The time window 2302 corresponds to the time interval $[t_3, t'_3]$. Event messages with time stamps in the time interval $[t_3, t'_3]$ are identified. The time interval $[t_3, t'_3]$ is divided into two equal length sub-time intervals $[t_3, t_c]$ and $[t_c, t'_3]$, where $t_c=(t'_3-t_3)/2$. A first set of event messages 2304 with time stamps in the first sub-time interval $[t_3, t_c]$ are identified. A second set of event messages 2306 with time stamps in the second sub-time interval $[t_c, t'_3]$ are identified. A first event-type distribution 2308 is computed from the first set of event messages 2304 and a second event-type distribution 2310 is computed from the second set of event messages 2306 as described above with reference to FIG. 19. A third divergence value $D_3$ 2312 is computed for the first and second event-type distributions 2308 and 2310 according to Equation (2) or (3).

As the time window incrementally advances or slides in time by the time step $\delta$, a divergence value is computed for event messages generated in the time interval covered by the time window as described above with reference to FIGS. 18-23. The divergence values computed over time form a sequence of divergence values represented by $$DV=(D_i)_{i=1}^N \quad (5)$$

where
$i=1, \ldots, N$ are measurement indices; and
$N$ is the number of measurement.

Figure 24:
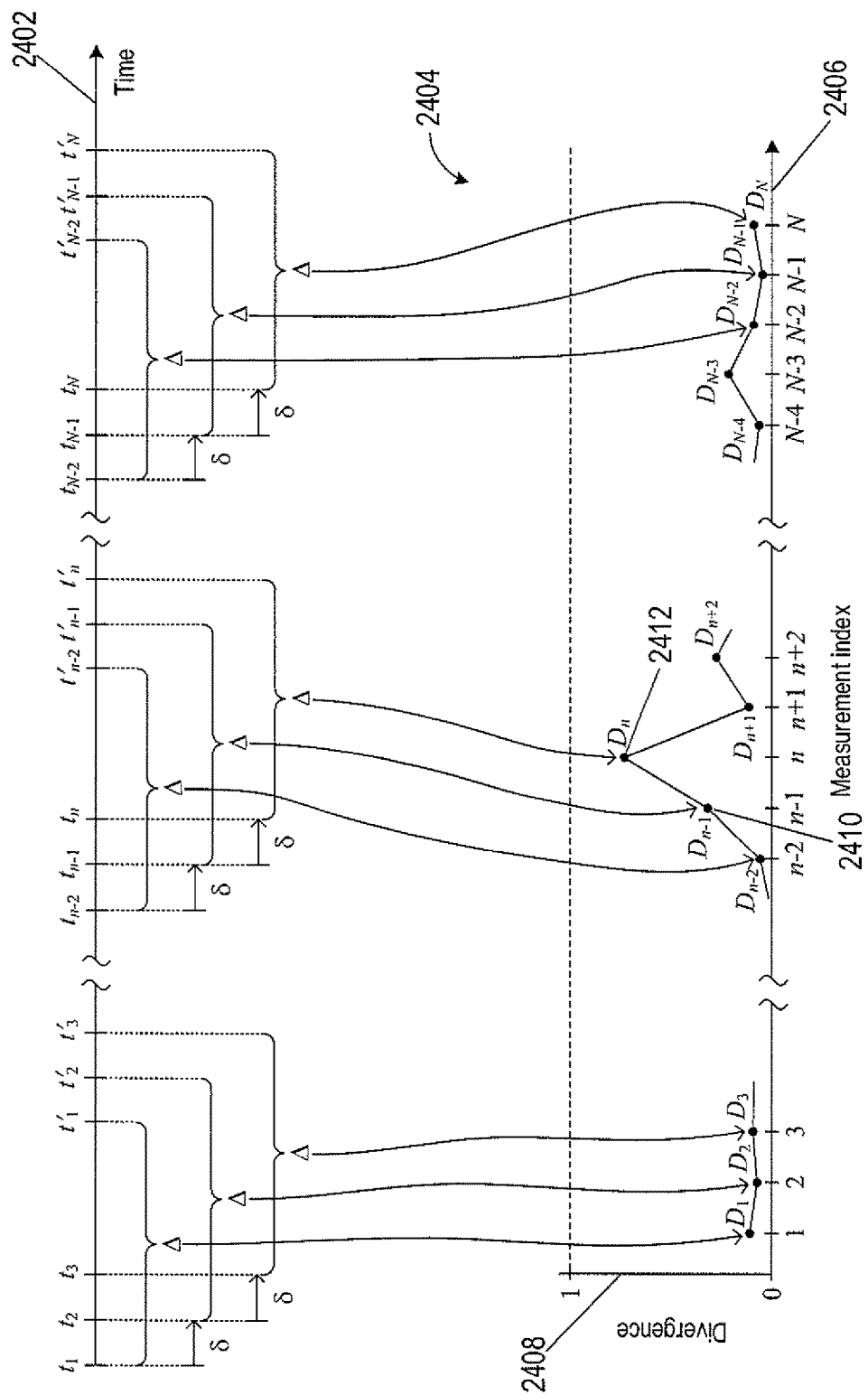
FIG. 24 shows a plot of a sequence of divergence values computed for overlapping time intervals.

FIG. 24 shows a plot of an example sequence of N consecutive divergence values computed for N overlapping time intervals. Directional arrow 2402 represents a time axis. Overlapping time intervals located on the time axis 2402 correspond to locations of the sliding time window incrementally advanced in time by the time step $\delta$. FIG. 24 includes a plot of divergence values 2404 computed for event messages with time stamps in each time window. Horizontal axis 2404 represents measuring indices. Vertical axis 2406 represents a range of divergence values. Divergence values represented by dots are computed for event messages with time stamps in each of the overlapping time intervals located along the time axis 2402 as described above with reference to FIGS. 18-23. Most of the divergence values are close to zero, which indicates no significant change in the event messages generated by the event source over time. On the other hand, larger divergence values $D_{n-1}$ 2410 and $D_n$ 2412 indicate a change has occurred in the event source. However, it is not clear when the change occurred. The change may have occurred in the time interval $[t_n, t'_n]$ associated with the larger of the two divergence values $D_n$, or the change may have occurred in one of the preceding time intervals $[t_{n-1}, t'_{n-1}]$ and time intervals $[t_{n-2}, t'_{n-2}]$.

When a divergence value is greater than a divergence value threshold $$D_n > Th_1 \quad (6)$$

the divergence value indicates a change in the event source. The divergence value threshold represents a limit for acceptable divergence value changes. For example, the divergence value threshold may be equal to 0.1, 0.15, or 0.2. In other implementations, when a rate of change in divergence values is greater than a rate of change threshold $$D_n - D_{n-1} > Th_2 \quad (7)$$

the divergence value $D_n$ indicates a change in the event source. The rate of change threshold represents a limit for acceptable increases between consecutive divergence values. For example, the rate of change threshold may be equal to 0.1, 0.15, or 0.2. When a change has been determined by either of the threshold violations represented in Equations (6) and (7), change point analysis is applied to the sequence of divergences values in order to quantitatively detect a change point for the object. The change point is then used to determine a potentially earlier start time of change in the object.

Change point analysis includes computing cumulative sums of divergence values as follows:

$$S_i = S_{i-1} + (D_i - \overline{D}) \quad (8)$$

where $S_0 = 0$;
$i = 1, \ldots, N$; and $\overline{D} = \frac{1}{N}\sum_{i=1}^{N} D_i$ is the mean value of the divergence values.

In other implementations, rather than using the mean value, $\overline{D}$ is the median of the sequence of divergence values.

Figure 25:
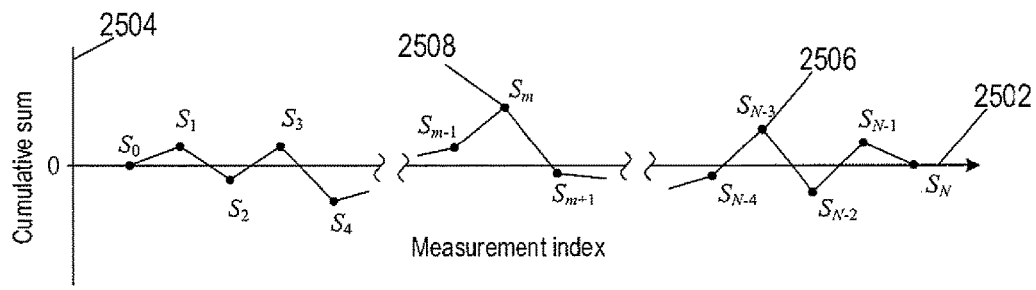
FIG. 25 shows a plot of example cumulative sum values.

FIG. 25 shows a plot of example cumulative sum values. Horizontal axis 2502 represents measurement indices. Vertical axis 2504 represents a range of cumulative sum values. Dots represent the values of the cumulative sum for each measurement index. For example, dot 2506 represents the cumulative sum value for the measurement index i=N−3. Note that the initial value of the cumulative sum $S_0$ is zero by definition. The final value of the cumulative sum $S_N$ is also zero.

The measurement index of the largest cumulative sum value in the sequence of cumulative sum values is determined:

$$S_m = \max((S_i)_{i=1}^N) \quad (9)$$

where m is the measurement index of the maximum cumulative sum value $S_m$.

The measurement index m is called the chance point. The change point index m is the index of the time interval $[t_m, t'_m]$ in which the change is detected by the maximum cumulative sum. The change point is the time $t_m$ that marks the beginning of the time interval $[t_m, t'_m]$. For example, in FIG. 25, cumulative sum value 2508 is the largest cumulative sum value. The change point index is used to determine a start time of the change. The start time of the change is determined by initially partitioning the divergence values into two sequences of divergence values based on the change point index m as follows:

$$DV = (D_i)_{i=1}^N = (D_i)_{i=1}^m \cup (D_i)_{i=m+1}^N \quad (10)$$

Figure 26:
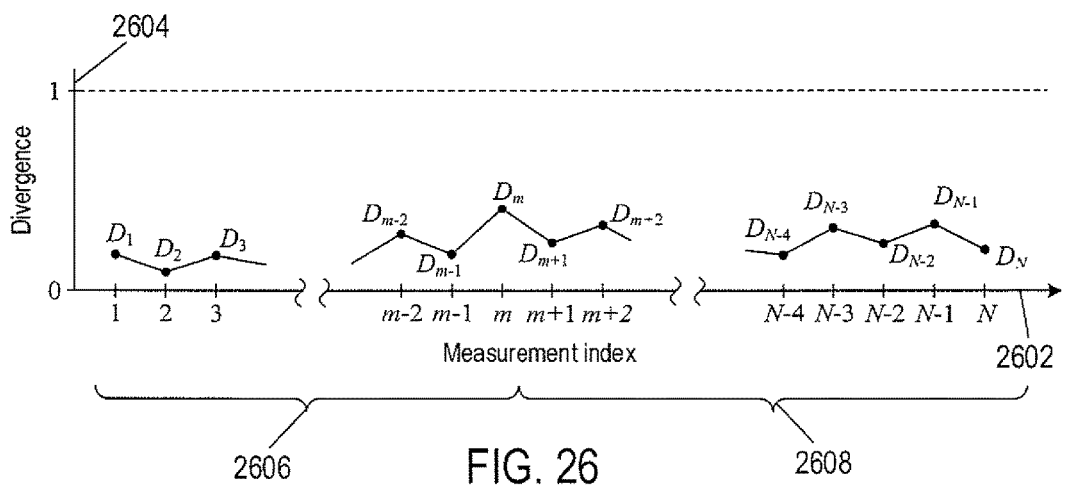
FIG. 26 shows a plot of example divergence values.

FIG. 26 shows a plot of example divergence values of the cumulative sum values shown in FIG. 25. Horizontal axis 2602 represents measurement indices. Vertical axis 2604 represents a range of divergence values. In the example of FIG. 26, the change point index m of the maximum cumulative sum value $S_m$ is used to partition the sequence of divergence values into two sequences. The first sequence of divergence values 2606 comprises the first m divergence values in the sequence $(D_i)_{i=1}^m$. The second sequence of divergence values 2608 comprises the second N−m divergence values in the sequence $(D_i)_{i=m+1}^N$.

The first and second sequences of divergence values $(D_i)_{i=1}^m$ and $(D_i)_{i=m+1}^N$ are used to compute the mean square error of the sequence of divergences values as follows:

$$MSE(m) = \sum_{i=1}^m (D_i - \overline{D}_{1,m})^2 + \sum_{i=m+1}^N (D_i - \overline{D}_{m+1,N})^2 \quad (11)$$

where $$\overline{D}_{1,m} = \frac{1}{m}\sum_{i=1}^m D_i$$

$$\overline{D}_{m+1,N} = \frac{1}{N-m}\sum_{i=m+1}^N D_i$$

The quantity $\overline{D}_{1,m}$ is the average of the first sequence of divergence values. The quantity $\overline{D}_{m+1,N}$ is the average of the second sequence of divergences values. Starting with a measurement index k equal to the change point index m, and decrementing until k=1, a mean square error MSE(k) is computed according to Equation (11) until a mean square error MSE(k) that is less than or equal to MSE(m) is determined. The largest measurement index k that is less than the change point index m and satisfies the condition MSE(k)≤MSE(m) corresponds to a time interval $[t_k, t'_k]$, where the time $t_k$ is the start time of change and k is called the start time of change index. If MSE(k)>MSE(m) for k=1, ..., m, then the start time of change is the change point $t_m$. The following pseudocode represents one of many different ways of determining a start time of change:

```
1    int k = m;
2    for (k = m − 1; k = 0; k−−)
3    {
4        compute MSE (k); // using Equation (11)
5        if (MSE (k) ≤ MSE (m))
6        {
7            Start time of change index = k;
8            return (Change index);
9        }
10   }
11   Start time of change index = m;
12   return (Change index);
```

The above procedure minimizes the mean square error by decrementing from the measurement index m until a measurement index k that satisfies the condition MSE(k)≤MSE(m) is determined. The resulting start time of change index k is a "best" partition of the divergence values for which the divergence values in the sequence $(D_i)_{i=1}^k$ and the divergence values in the sequence $(D_i)_{i=k+1}^m$ are maximum fits to the respective means of these two sequences.

Figure 27:
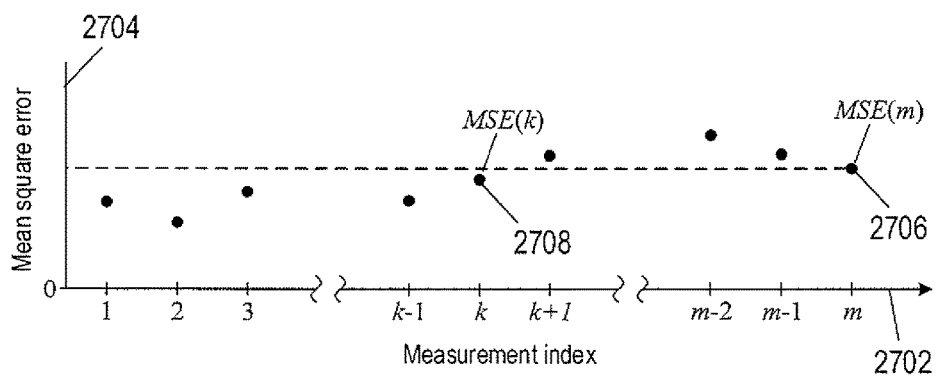
FIG. 27 shows a plot of example mean square error values.

FIG. 27 shows a plot of example mean square error values for measurement indices. Horizontal axis 2702 represents measurement indices. Vertical axis 2704 represents mean square error range. Dot 2706 represents the MSE(m) with the change point index m. Dot 2708 represents the MSE(k) computed for a measurement index k. In this example, the mean square error MSE(k) is smaller than the mean square error MSE(m). The MSE for indices k+1, ..., m−1 are greater than MSE(m). As a result, the measurement index k is the start time of change index.

A confidence level is computed for the start time of change index k as follows. A cumulative sum difference between the maximum cumulative sum represented by Equation (9) and a minimum cumulative sum is computed as follows:

$$S_{diff} = S_{max} - S_{min} \quad (12)$$

where
$S_{max} = S_m$; and
$S_{min} = \min(\{S_i\}_{i=1}^N)$.

The N divergence values in Equation (5) are randomized and re-ordered M times to form M randomized and re-ordered sequences of the N divergence values represented by:

$$RDV = \{(D_i^1)_{i=1}^N, (D_i^2)_{i=1}^N, \ldots, (D_i^M)_{i=1}^N\} \quad (13)$$

The value of M is a large positive integer. For example, the value of M may be 500, 1000, 1500, 2000 or any suitable large positive integer.

Figure 28:
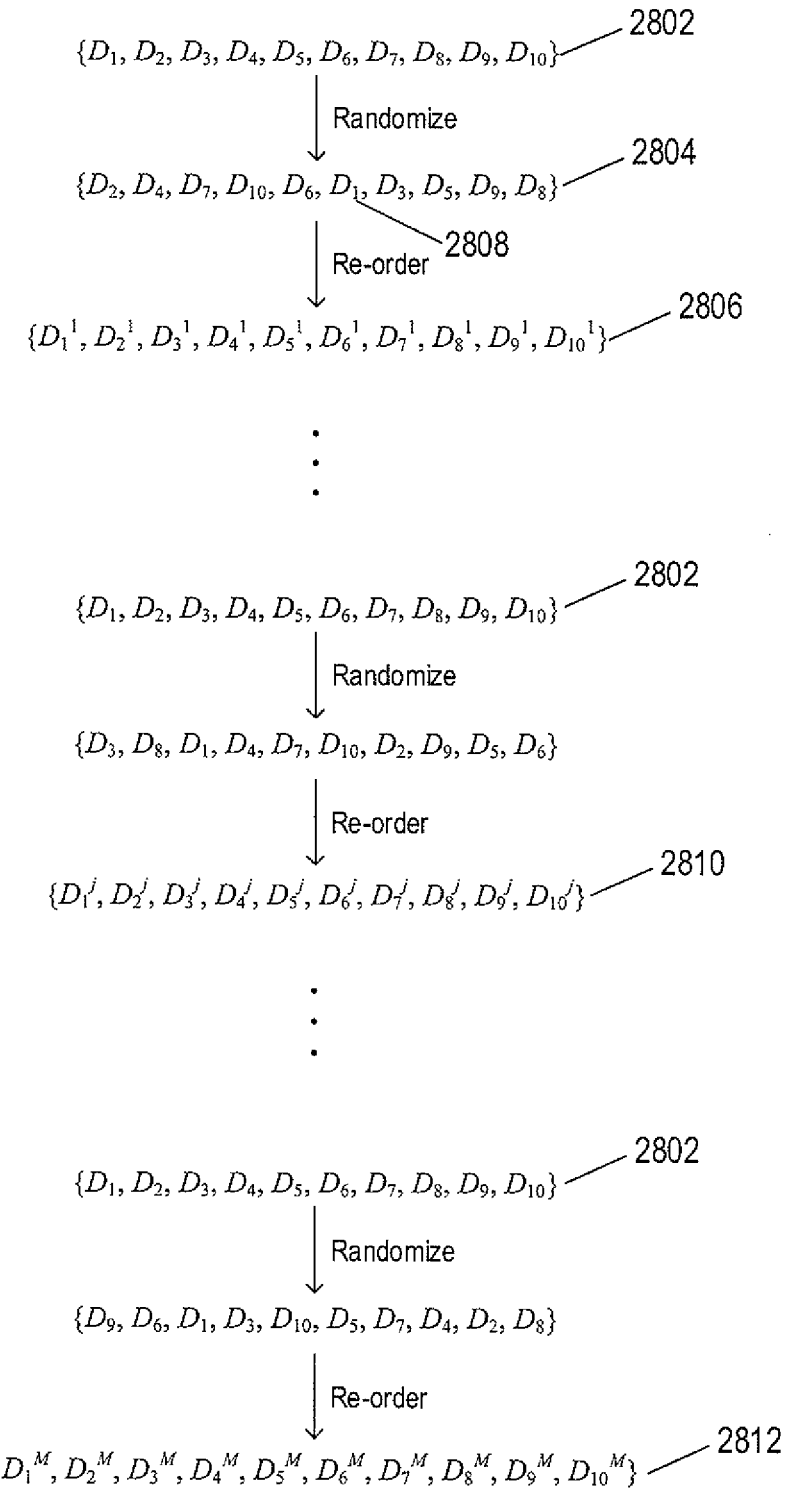
FIG. 28 shows examples of randomizing and re-ordering a sequence of divergence values.

FIG. 28 shows examples of randomizing and re-ordering the same sequence of divergence values to generate three different randomized and re-ordered sequences of divergence values. The ordered sequence of 10 divergence values 2802 is randomized to obtain a randomized sequence of divergence values 2804. The randomized sequence of divergence values 2804 is then re-ordered to obtain a first randomized and re-ordered sequence of divergence values 2806. For example, after randomization, the first divergence value $D_1$ in the ordered sequence of divergence values 2802 is placed in the sixth position 2808 in the randomized sequence of divergence values 2804. The divergence value $D_1$ is then re-ordered as $D_6^1$. In other words, after randomization and re-ordering $D_6^1 = D_1$ in the randomized and re-ordered sequence of divergence values 2806. FIG. 28 also shows a j-th randomized and re-ordered sequence of divergence values 2810 and an M-th randomized and re-ordered sequence of divergence values 2812.

Cumulative sum values are computed for j=1, ..., M of the M randomized and re-ordered sequences of divergence values as follows:

$$S_i^j = S_{i-1}^j + (D_i^j - \overline{D}^j) \tag{14}$$

A cumulative sum difference is computed for j=1, ..., M of the M randomized and re-ordered sequences of divergence values as follows:

$$S_{diff}^j = S_{max}^j - S_{min}^j \tag{15}$$

where
$S_{max}^j = \max((S_i^j)_{i=1}^N)$; and
$S_{min}^j = \min((S_i^j)_{i=1}^N)$.
A count of the number of cumulative sum differences $S_{diff}^j$ of the M randomized and re-ordered sequences of divergence values that are less than the cumulative sum difference $S_{diff}$ of the original sequence of divergence values is determined and denoted by $$C = \text{Count}(S_{diff}^j < S_{diff}) \tag{16}$$

The count is used to compute a confidence level for the start time of change index determined above as follows:

$$\text{Confidence level} = \frac{C}{N} \times 100 \tag{17}$$

The confidence level indicates that if the process used to determine the start time of change index k were repeated M times, the start time of change index obtained each time would equal the start time of change index k obtained from the original sequence of divergence values (C/N)×100 percent of the time.

In another implementation, rather than using cumulative sums and confidence levels to determine the start time of change for historical event messages generated by an event source, methods include maintaining an empirical distribution of divergence values for a stream of event messages generated in real time by an event source. The empirical distribution of divergence values is constructed for an event source and updated as event messages are generated. In other words, for each time step of the sliding time window, a divergence value for event messages generated within the time interval covered by the time window is computed an an empirical distribution of divergence values is updated. The divergence range [0,1] is partitioned into a number of histogram subranges. Counters of divergence values that fall into the different histogram ranges are maintained. The resulting distribution of divergence values over time contains patterns of consecutive changes in the stream of event messages. Any divergence values that exhibit variation in neighboring sliding time windows will appear in the ε-tail of the distribution, indicating an atypicality or change at the event source.

Figure 29A:
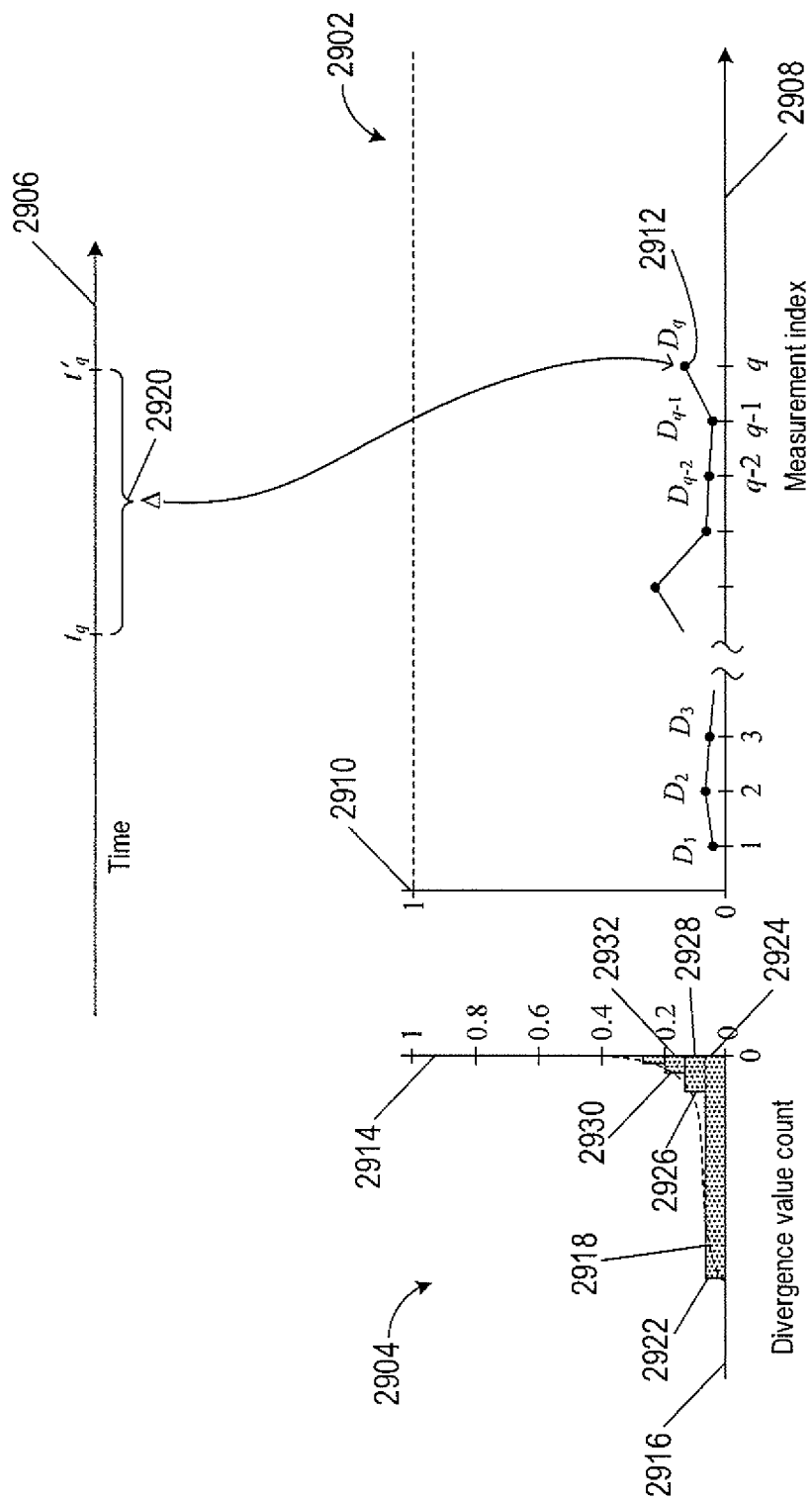
FIG. 29A-29C show plots of example divergence values and a corresponding histogram of the divergence values for a stream of event messages.
Figure 29B:
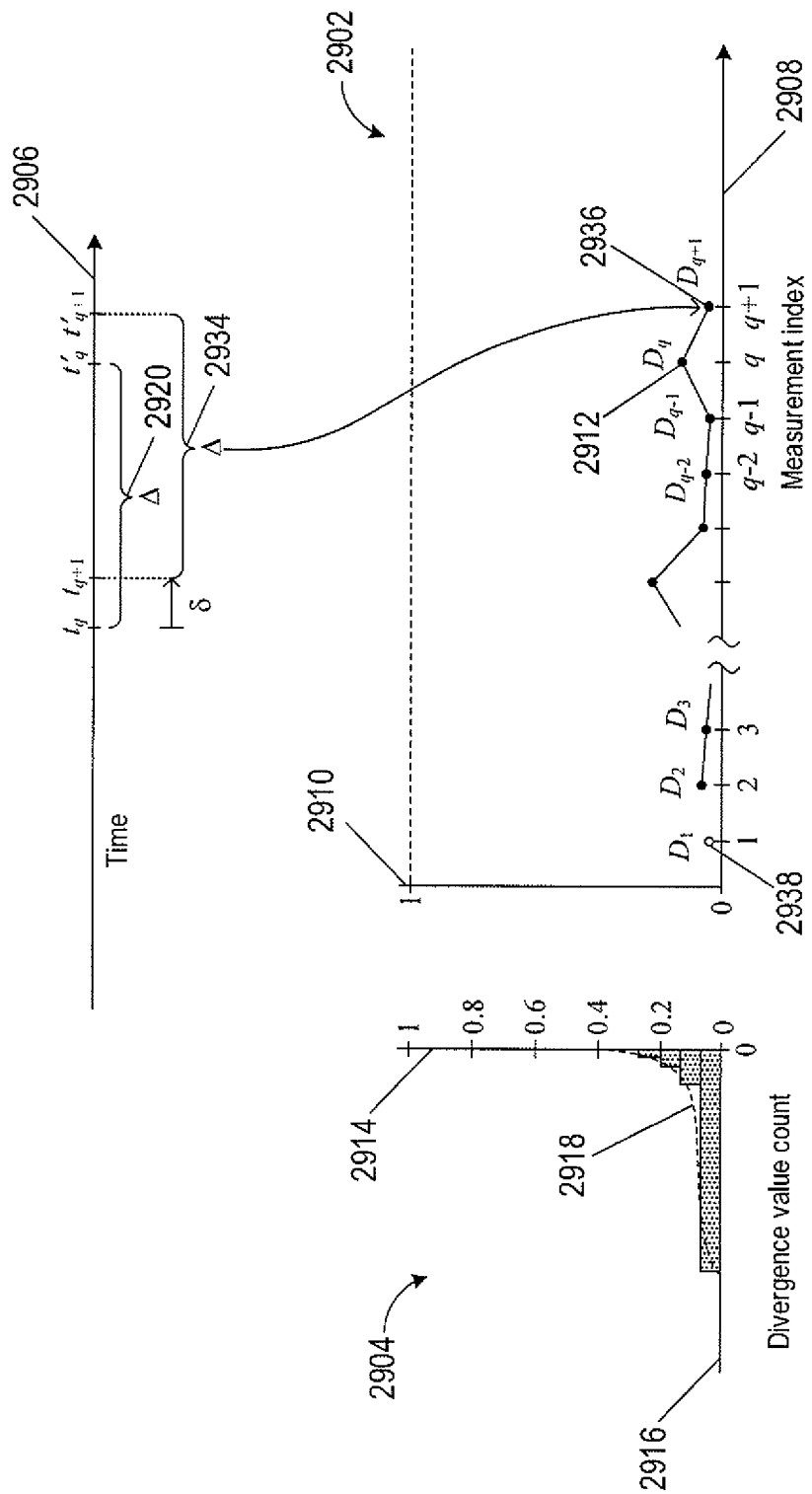
Figure 29C:
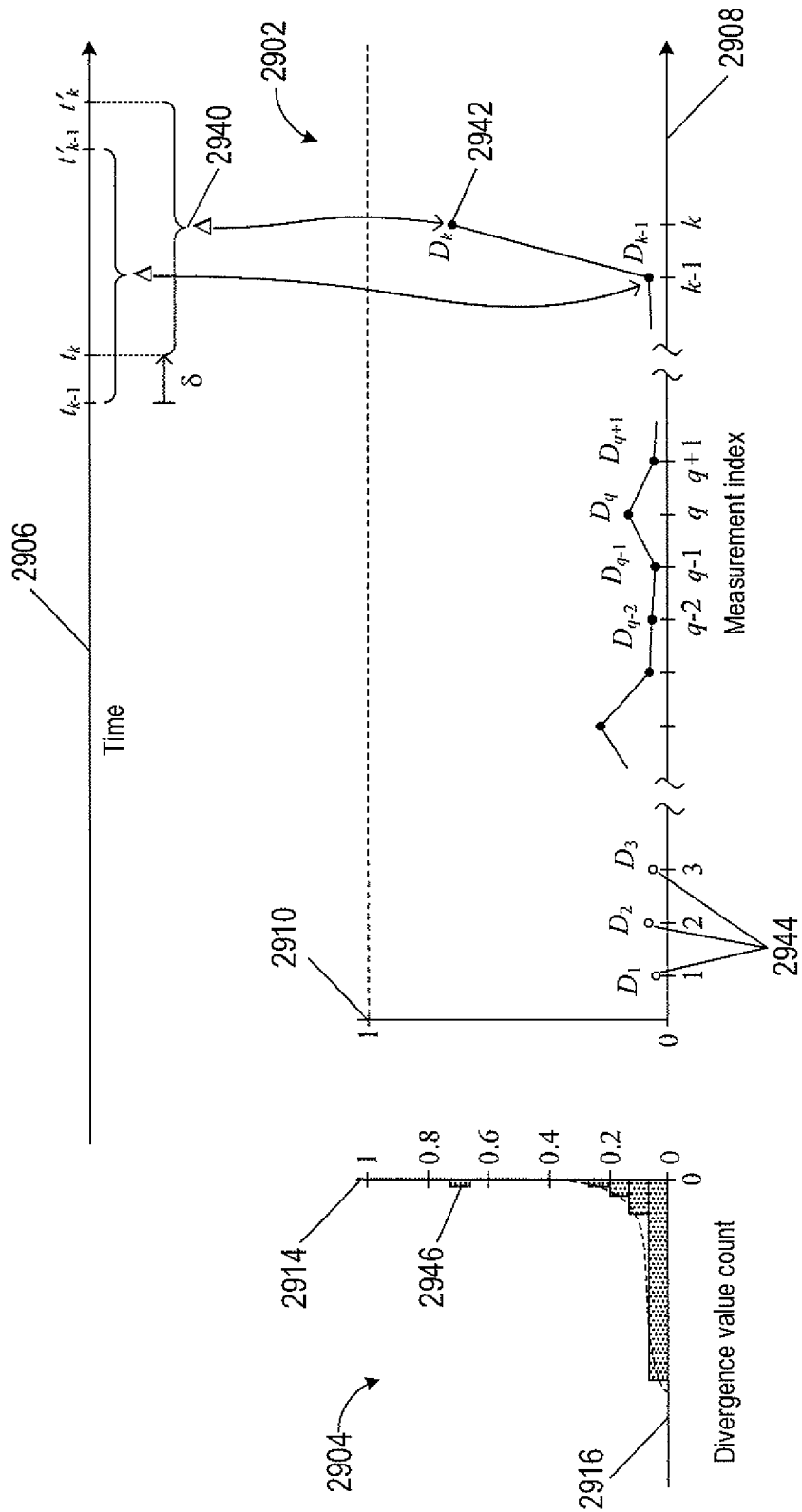

FIG. 29A-29C show plots of example divergence values 2902 and a corresponding histogram of the divergence values 2904 for a stream of event messages generated in real time by an event source. FIGS. 29A-29C include a horizontal time axis 2906. For each incremental step of a sliding time window along the time axis 2906, a divergence value is computed for the event messages with time stamps in the time interval covered by the time window. In plot 2902, horizontal axis 2908 represents measurement indices. Vertical axis 2910 represents a range of divergence values. Dots, such as dot 2912, represent divergence values computed for event messages generated in real time with time stamps in time intervals covered by a sliding time window as described above with reference to FIGS. 18-24. In histogram plot 2904, vertical axis 2914 represents a range of divergence values that corresponds to the range of divergence values of axis 2910. Horizontal axis 2916 represents a divergence value count. Bars in the plot 2904 represent the count of divergence values that fall within associated divergence value intervals or histogram ranges. Histogram ranges are denoted by $[0, h_1), [h_1, h_2), \ldots, [h_s, h_{s+1}), \ldots, [h_S, 1]$ and corresponding counters are denoted by $C_0, C_1, \ldots, C_s, \ldots, C_S$. When a divergence value falls within one of the intervals, the corresponding counter is incremented. Bar 2922 represents the number of divergence values in the sequence $(D_i)_{i=1}^q$ with values in the histogram range [0, 0.067) 2924. Bar 2926 represents the number of divergence values in the sequence $(D_i)_{i=1}^q$ with values in the histogram range [0.067, 0.134) 2928. Bar 2930 represents the number of divergence values in the sequence $(D_i)_{i=1}^q$ with values in the histogram range [0.134,2] 2932. The counts of the divergence values represented in the histogram 2904 are distributed according to a dashed curve 2918.

In certain implementations, the divergence values are distributed according to a normal distribution with a mean denoted by x_mean and a standard deviation denoted by x_std. Although divergence values are greater than or equal to zero, assuming the divergence values are normally distributed, the standard deviation of the assumed normal distribution, denoted by x_std, is determined. Divergence values that occur outside an interval [0, x_std] are identified as outliers, where x_std is the x-th standard deviation of the counts of divergence values assuming the divergence values are normally distributed. The x_std is used as a threshold to identify outlier divergence values. For example, x_std may be the first, second, third, or higher standard deviation. Counters $C_s, \ldots, C_S$ may correspond to divergence values (i.e., outliers) that are greater than the standard deviation x_std. In other implementations, a threshold to identify outlier divergence values may be a selected value greater than zero.

In FIG. 29A, a time window 2920 is located at the time interval $[t_q, t'_q]$. The sequence of divergence values displayed in the plot 2902 is $\{D_i\}_{i=1}^q$. The divergence value $D_q$ 2912 is the q-th divergence value computed for event messages with time stamps in the time interval $[t_q, t'_q]$. In FIG. 29B, the time window 2934 is moved by the time step δ to a time interval $[t_{q+1}, t'_{q+1}]$. A divergence value $D_{q+1}$ 2936 is computed for event messages generated within the time interval $[t_{q+1}, t'_{q+1}]$ 2930. The sequence of divergence values $(D_i)_{i=1}^q$ is updated by deleting the oldest divergence value $D_1$ and associated time stamps, as represented by open circle 2938 and adding the most recently computed divergence value $D_{q+1}$ 2936 to obtain the sequence of divergence values $(D_i)_{i=2}^{q+1}$. The divergence value counts in the histogram 2904 are updated. In FIG. 29C, the time window is moved a number of times by the time step δ to a time interval $[t_k, t'_k]$ 2940. A divergence value $D_k$ 2942 is computed for event messages with time stamps in the time interval $[t_k, t'_k]$ 2940. The sequence of divergence values has been updated for each incremental advance of the time window by deleting the oldest divergence value as represented by open circles 2944 and adding the most recently computed divergence value $D_k$ 2942. In this example, when the divergence value counts in the histogram 2904 are updated, the histogram includes a count for the divergence value $D_k$ 2942 as represented by bar 2946. Because the count of divergence values represented by bar 2946 is greater than the x-th standard deviation (i.e., x_std), the divergence value $D_k$ 2942 is identified as an outlier and the measurement index k is the start time of change index.

The start time of change index k is obtained from change point analysis or from the divergence value outlier determined for streaming event messages has a corresponding change time interval $[t_k, t'_k]$. A rate of change is calculated for each event type. A ranked list of event types of mismatched pre- and post-change point event type patterns is determined. In particular, a rate of change or difference between relative frequencies is computed for each event type in the event type distribution in the change time interval $[t_k, t'_k]$ of the start time of change index k and in the event type distribution in a preceding, or pre-change, time interval.

Figure 30A:
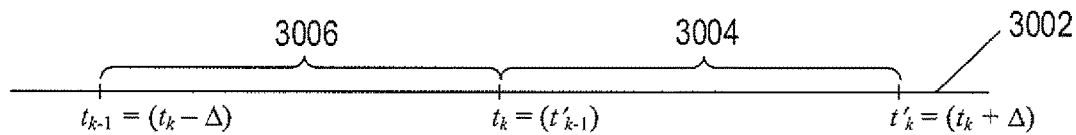
FIGS. 30A-30C show determination of a ranked list of event types.
Figure 30B:
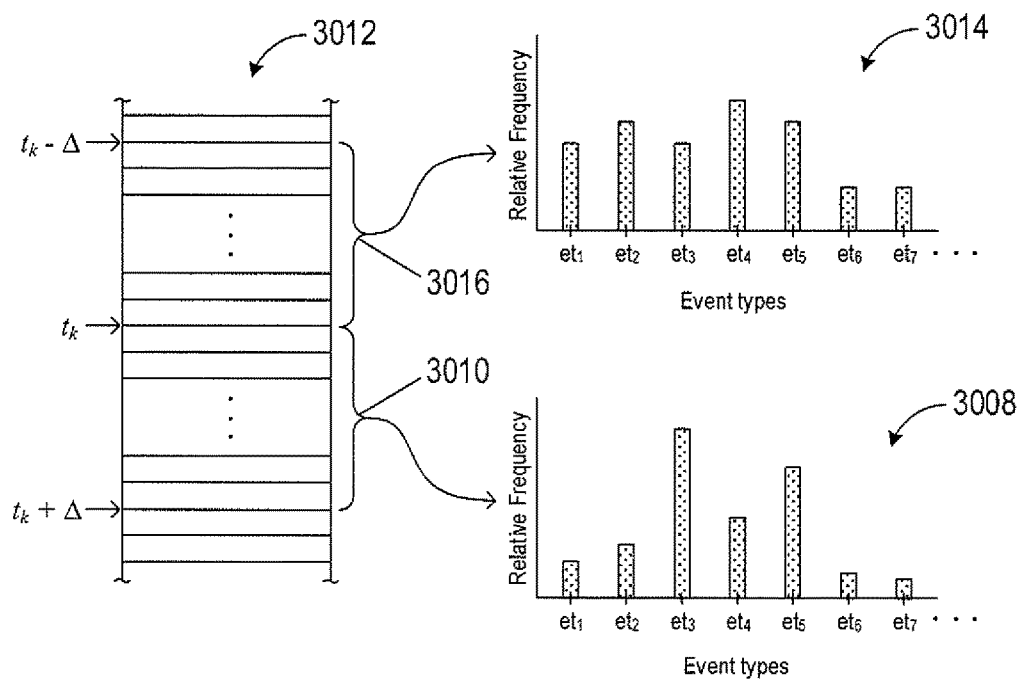
Figure 30C:
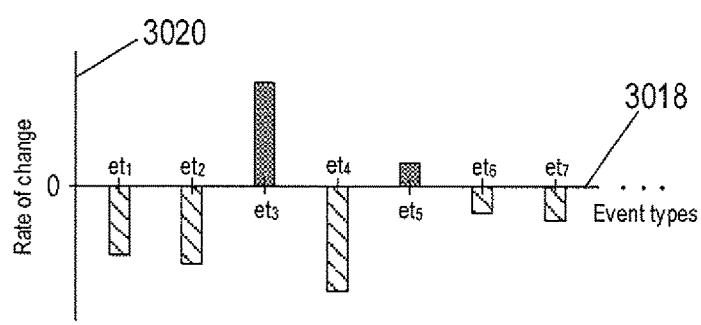

FIGS. 30A-30C show determination of a ranked list of event types for a start time of change index k. In FIG. 30A, horizontal axis 3002 represents time. Change time interval $[t_k, t'_k]$ 3004 corresponds to the start time of change index k obtained from change point analysis. Time interval $[t_{k-1}, t'_{k-1}]$ 3006 is a pre-change time interval. In FIG. 30B, an event type distribution 3008 is computed for event messages 3010 with time stamps in the change time interval $[t_k, t'_k]$ 3004 recorded in an event log 3012. An event type distribution 3014 is computed for event messages 3016 with time stamps in a pre-change time interval $[t_{k-1}, t'_{k-1}]$ 3006 recorded in the event log 3012. A rate of change is computed for each event type as a difference between relative frequencies in the pre-change time interval and the change time interval as follows:

$$RC_l = RF_{l,k} - RF_{l,k-1} \quad (18)$$

where $RF_{l,k}$ is a relative frequency of the l-th event type in the event-type distribution of the change time interval $[t_k, t'_k]$; and $RF_{l,k-1}$ is a relative frequency of the l-th event type in the event-type distribution of the pre-change time interval $[t_{k-1}, t'_{k-1}]$.

FIG. 30C shows a plot of rates of change for the event types in the pre-change time interval and event types in change time interval. Horizontal axis 3018 represents event types. Vertical axis 3020 represents rate of change. In FIG. 30C, event types $et_3$ and $et_5$ increase while other event types decrease. The event types may be rank ordered from event types with the largest absolute rates of change to event types with the smallest absolute rates of change. For example, the event types in FIG. 30C may be rank order from largest to smallest absolute rates of change as follows:

$$|RC_4| > |RC_3| > |RC_2| > |RC_1| > |RC_7| > |RC_6| > |RC_5| \quad (19)$$

The event types with the largest rates of change, such as event types $et_3$ and $et_4$, may be examined using a search to identify what kind of events generated by the event source am decreasing or increasing. For example, the event type $et_3$ may include warnings statements or phrases that correspond to recommendations for how to address the problem. The recommendations may be generated for event types with the largest of rates of change.

In other implementations, the event types may be grouped according to increasing (i.e., positive) and decreasing (i.e., negative) rates of change and rank ordered within each group. For example, event types in FIG. 30 with increasing rates of change are rank ordered (i.e., $RC_3 > RC_5 > 0$) from largest to smallest rates of change are $\{et_3, et_5\}$. Event types in FIG. 30 with corresponding decreasing rates of change are rank ordered (i.e., $RC_4 > RC_2 > RC_1 > RC_7 > RC_6 > 0$) from largest to smallest rates of changes to obtain corresponding rank ordered event types $\{et_4, et_2, et_1, et_7, et_6\}$. The event types with the largest rate of change, such as event types $et_3$ and $et_4$, may be examined using a search to identify what kind of events generated by the event source are responsible for the largest changes.

A change is classified by comparing the event-type distribution associated with the change point index (i.e., measurement index m) with event-type distributions that have been identified as representing various kinds of changes at previous change point indices. A system administrator may classify event-type distributions associated with previously identified change point indices. For example, overprovisioning of particular resource, such memory, CPU, data storage, is a type class. A systems administrator may have observed that when overprovisioning of particular resource has occurred at previously observed change point indices, approximately the same event-type distribution is produced in the time intervals of the change point indices. Workload increases are another type of class. A systems administrator may have observed that when workload increases occur at previously observed change point indices, approximately the same event-type distribution is produced in the time intervals of the change point indices. A change may be classified by computing the divergence between an event-type distribution produced in the time interval of a change point index and each of the event-type distributions of the different identified change classifications.

Figure 31:
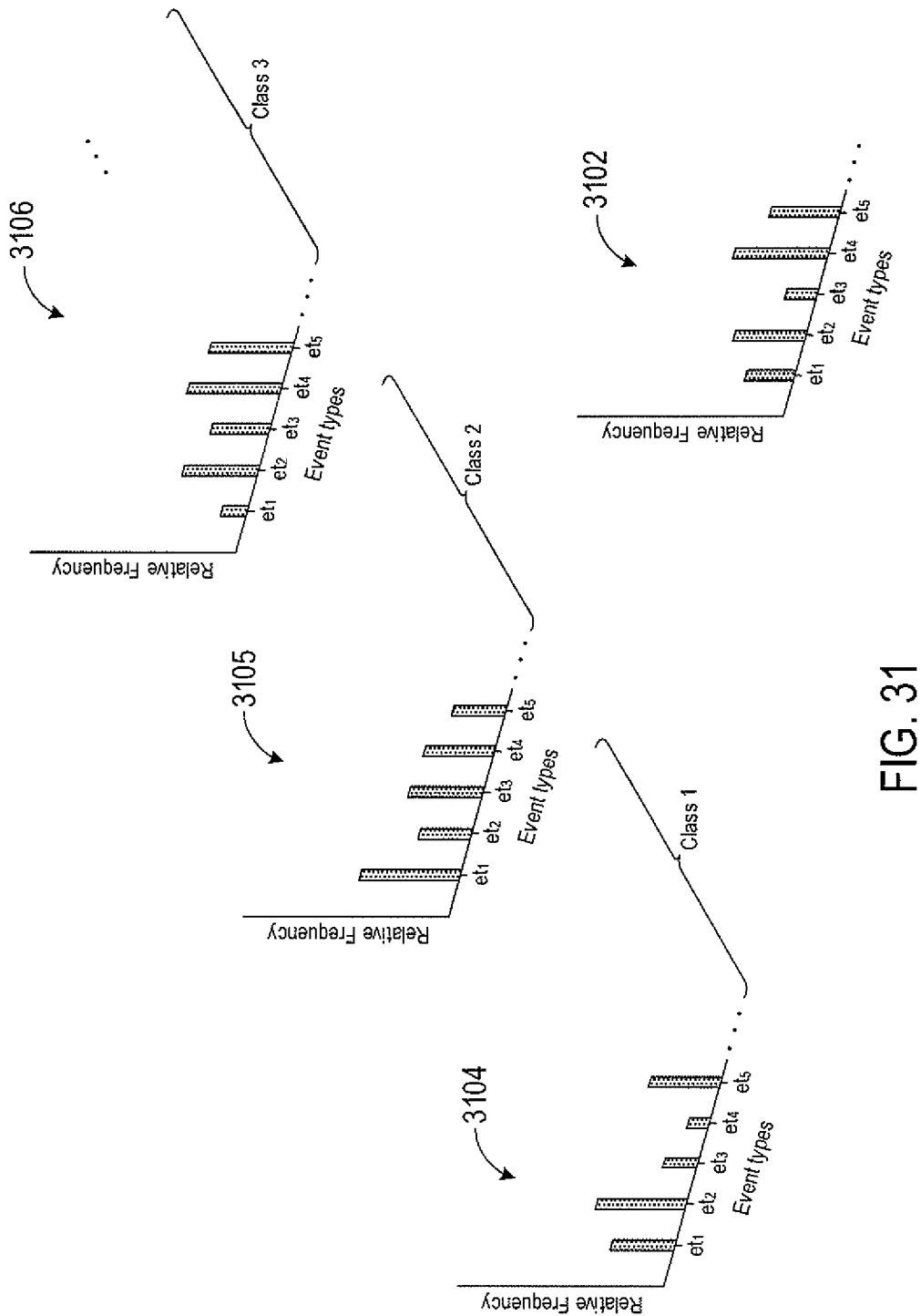
FIG. 31 shows an example of an event-type distribution and examples of representative event-type distributions.

FIG. 31 shows an example of an event-type distribution 3102 of events generated in a time interval that corresponds to a change point as described above with reference to Equations (6) and (7). The change point index (i.e., measurement index m) is determined as described above with reference Equation (9) and the event-type distribution 3102 is obtained from the event types generated in the time interval $[t_m, t'_m]$. FIG. 31 shows three of many classes of event types denoted by "Class 1," "Class 2," and "Class 3." Each class represents a different kind of previously classified change. For example, Class 1 may be overloaded memory, Class 2 may be an overloaded CPU usage, and Class 3 may be an increase in workload. FIG. 31 also shows examples of representative event-type distributions 3104-3106 for each of the three classes. The representative event-type distribution 3104 represents the event-type distributions identified as being of Class 1. The representative event-type distribution 3105 represents the event-type distributions identified as being of Class 2. The representative event-type distribution 3106 represents the event-type distributions identified as being of Class 3.

A divergence value is computed between the event-type distribution 3102 and each of the event-type distributions in the classes using either Equation (2) or (3). The divergence values may be rank ordered. The k-nearest neighbor representative event-type distributions to the event-type distribution 3201 have the k smallest divergence values. The change may be identified as the class with the largest number (i.e., largest frequency) of divergence values in the set of k smallest divergence values. For example, suppose the following set of seven (k=7) smallest divergence values is computed for the event-type distribution 3102 and seven event-type distributions in the classes Class 1, Class 2, and Class 3:

$$\{D_1^1, D_2^1, D_1^2, D_2^2, D_3^2, D_1^3, D_2^3\}$$

where superscripts represent the class and the subscripts distinguish the event-type distributions within the three classes. In this example, the highest frequency divergence value occurs for the Class 2. As a result, the event-type distribution 3102 is closest to the event-type distributions in the Class 2 and the change is identified as a Class 2 change. The change has been classified, the systems administrator may be notified of the type of the change that has occurred and a corresponding recommendation may be generated for addresses the change.

Figure 32:
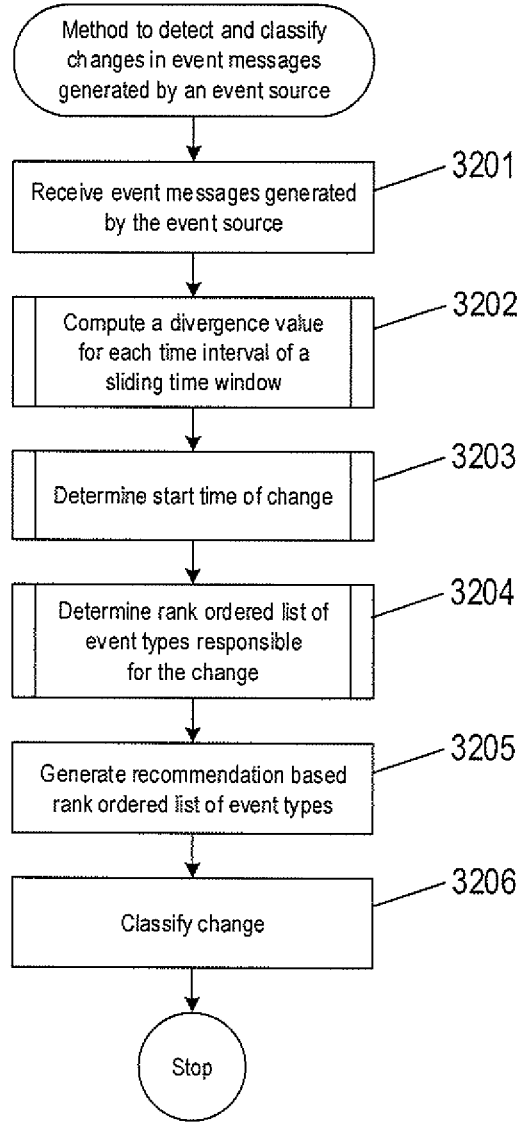
FIG. 32 shows a control-flow diagram of a method to detect and classify changes in event messages generated by an event source.

FIG. 32 shows a control-flow diagram of a method to detect and classify changes in event messages generated by an event source. In block 3201, event messages generated by an event source of an object in a distributed computing system are received. In block 3202, a routine "compute a divergence value for each time interval of a sliding window" is called. In block 3303, a routine "determine start time of change" is called. In block 3204, a routine "determine rank ordered list of event types responsible for the change" is called. In block 3205, a recommendation based on the rank ordered list of event types is generated. In block 3206, the change identified at the change point is classified as described above with reference to FIG. 31.

Figure 33:
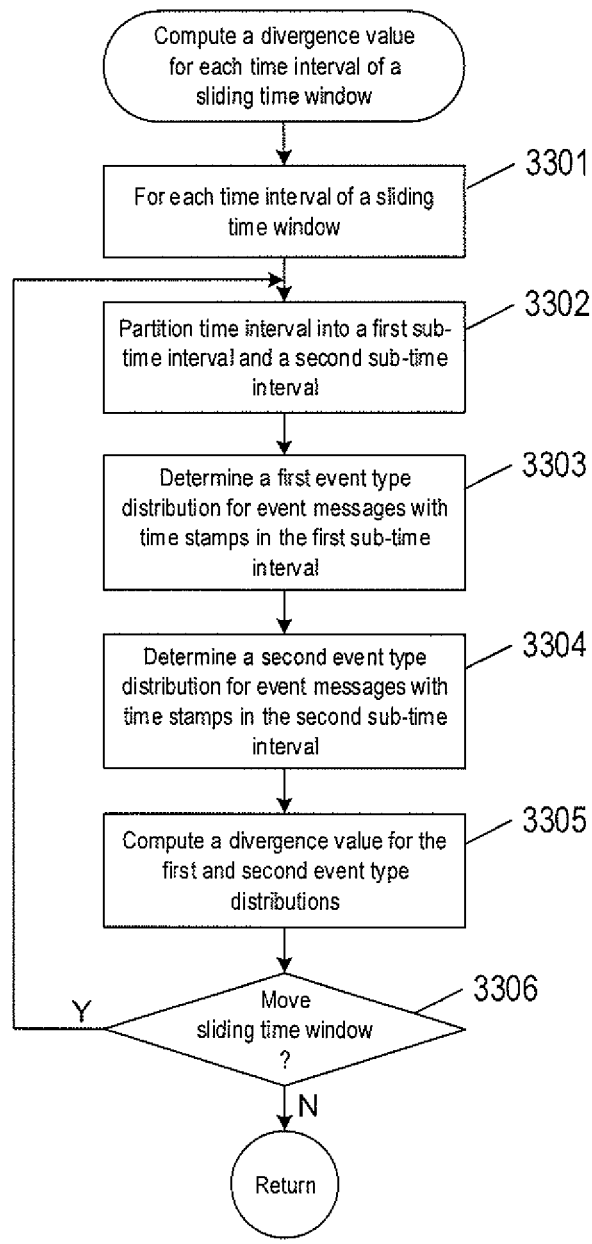
FIG. 33 shows a control-flow diagram of the routine "compute a divergence value for each time interval of a sliding time window" called in FIG. 32.

FIG. 33 shows a control-flow diagram of the routine "compute a divergence value for each time interval of a sliding time window" called in block 3202 of FIG. 32. A loop beginning with block 3301 repeats the operations of blocks 3302-3305 for each time interval of sliding time window. In block 3302, a time interval is partitioned into a first sub-time interval and a second time interval as described above with reference to FIG. 18. In block 3303 a first event-type distribution of event messages with time stamps in the first sub-time interval is determined as described above with reference to FIG. 19. In block 3304, a second event-type distribution of event message with time stamps in the second sub-time interval is determined as described above with reference to FIG. 19. In block 3305, a divergence value is computed for the first and second event types distributions using Equation (2) or (3). In decision block 3306, the sliding time window is moved to an overlapping time interval as described above with reference to FIG. 24.

Figure 34:
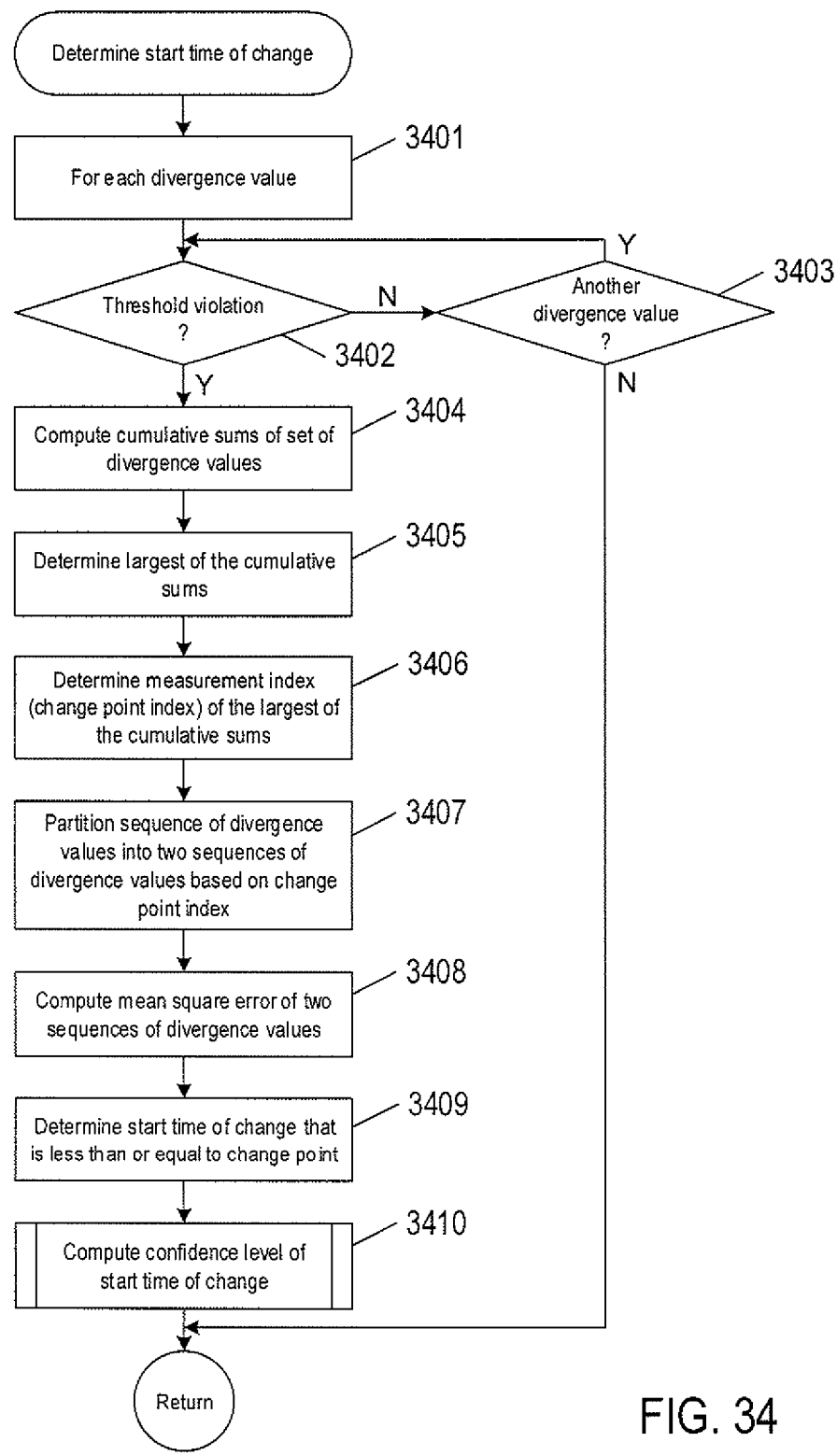
FIG. 34 shows a control-flow diagram of the routine "determine start time of change" called in FIG. 32.

FIG. 34 shows a control-flow diagram of the routine "determine start time of change" called in block 3203 of FIG. 32. A loop beginning with block 3401 repeats the operations of blocks 3402-3406 for each divergence value. In decision block 3402, when a threshold violation has occurred, as described above with reference to Equation (6) or (7), control flows to block 3404. Otherwise control flows to block 3403. In block 3404, cumulative sums of the divergence values are computed for the time intervals as described above with reference to Equation (8). In block 3405, a largest of the cumulative sums is determined as described above with reference to Equation (9). In block 3406, a measurement index of the largest of the cumulative sums, also called a change point index, is determined as described above with reference to FIG. 25. In block 3407, the divergence values are partitioned into two sequences of divergence values based on the measurement index of the largest of the cumulative sums as described above with reference to Equation (10). In block 3408, a mean square error at the measurement index is computed based on the two sequences of divergence values as described above with reference to Equation (11). In block 3409, a start time of change that is less than or equal to the change point is determined as described above with reference to FIG. 27. The start time of change may be less than or equal to the change point. In block 3410, a routine "compute confidence level of start time of change" is called.

Figure 35:
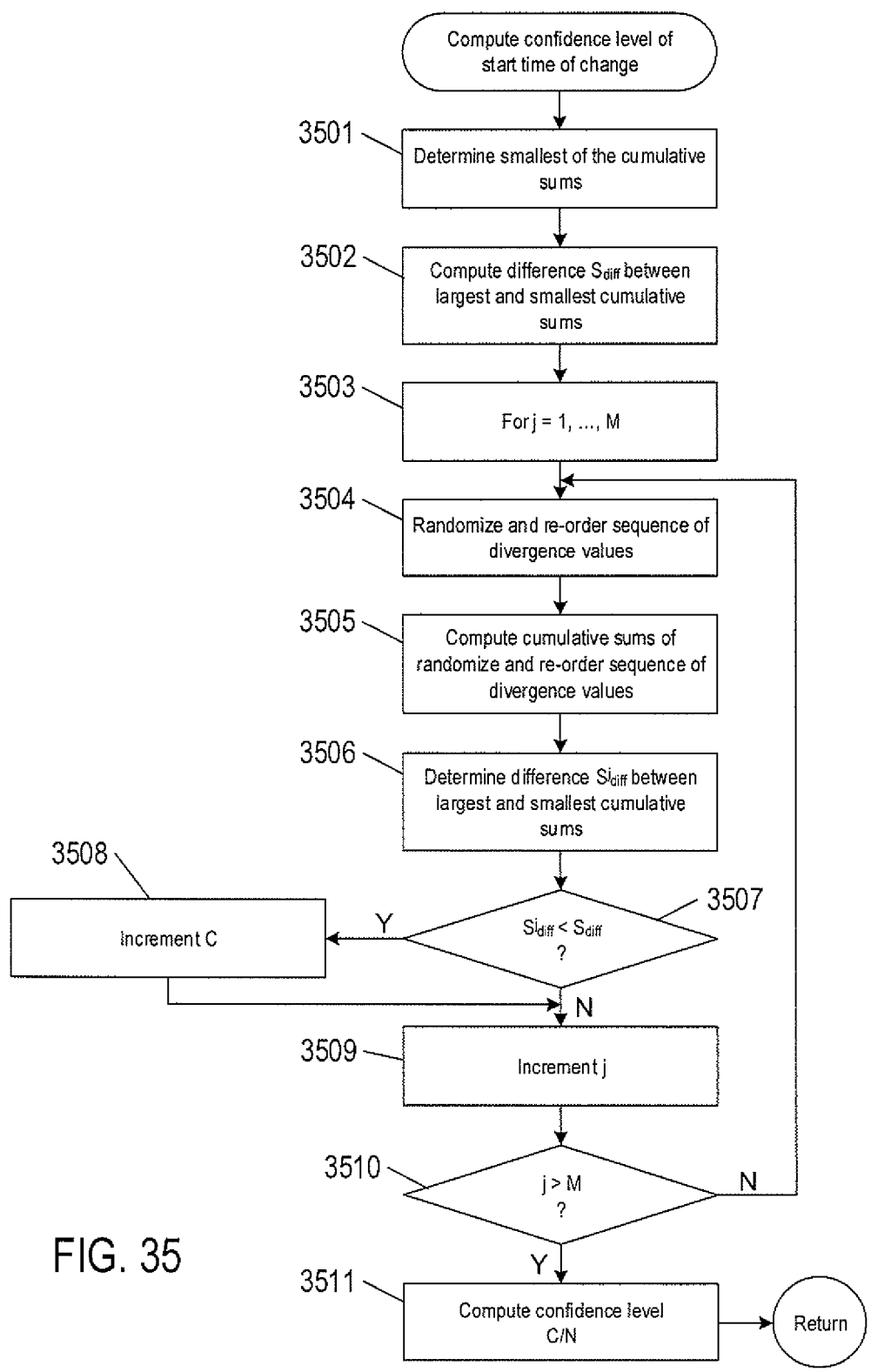
FIG. 35 shows a control-flow diagram of the routine "compute confidence level of start time of change" called in FIG. 34.

FIG. 35 shows a control-flow diagram of the routine "compute confidence level of start time of change" called in block 3410 of FIG. 34. In block 3501, a minimum cumulative sum is determined. In block 3502, a cumulative sum difference $S_{diff}$ is computed between the maximum cumulative sum and the minimum cumulative sum as described above with reference to Equation (12). A loop beginning with block 3503 repeats the computational operations of blocks 3504-3510 for the M randomized and re-order divergence values. In block 3504, the sequence of divergence values is randomized and re-order to form a randomized and re-ordered sequence of divergence values as described above with reference to FIG. 28. In block 3505, cumulative sum values are computed the sequence of randomized and re-ordered sequences of divergence values as described above with reference to Equation (14). In block 3506, a cumulative sum difference $S_{diff}^j$ is computed for the randomized and re-ordered sequence of divergence values as described above with reference to Equation (15). In decision block 3507, when the cumulative sum difference $S_{diff}^j$ is less than the cumulative sum difference $S_{diff}$, control flows to block 3608 in which a counter C is incremented as described above with reference to Equation (16). In block 3509, the randomized and re-order index j is incremented. In decision block 3510, when the index j is greater than M, control flows to block 3611. In block 3511, a confidence level for the change index is computed according to Equation (17).

Figure 36:
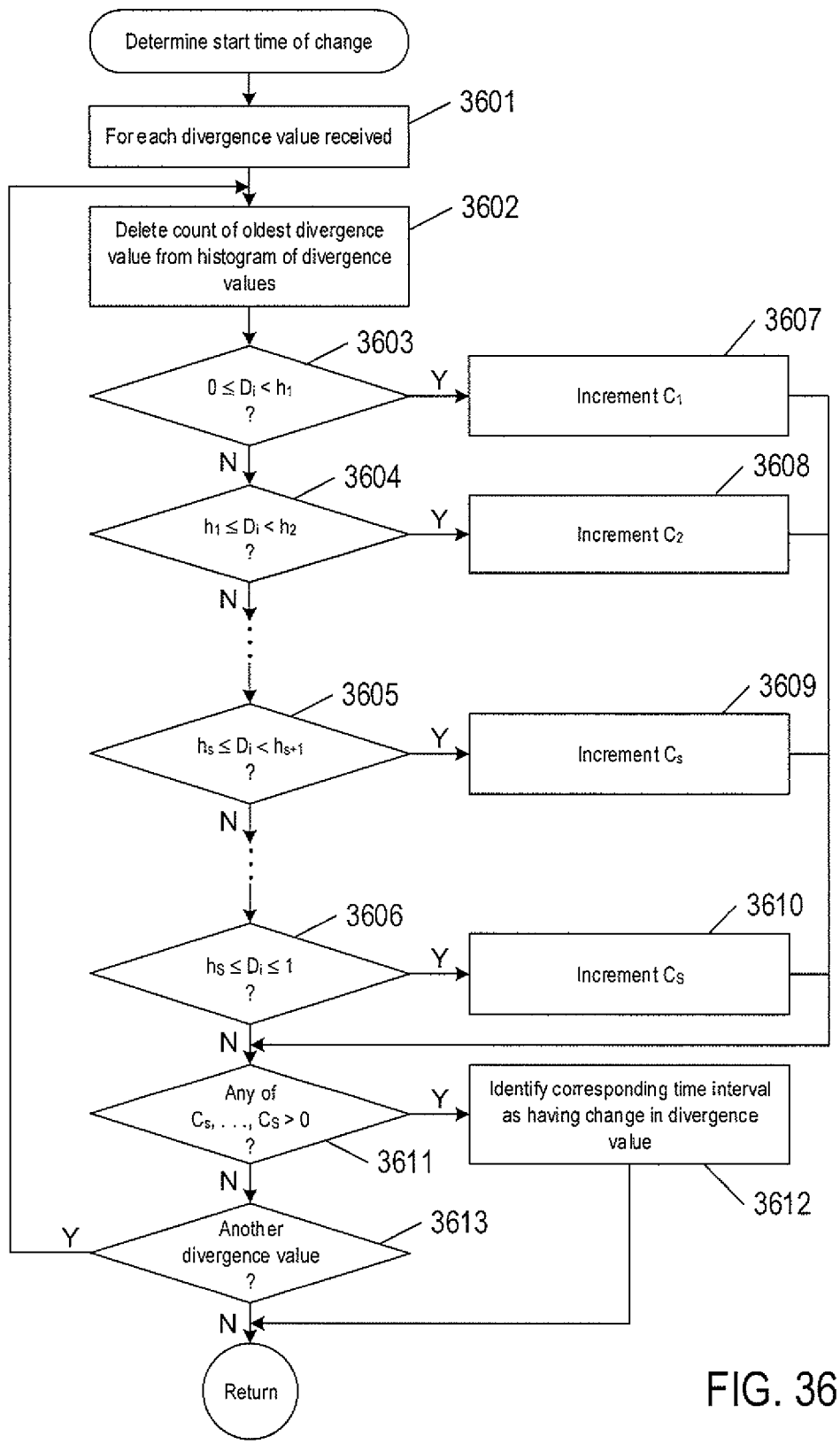
FIG. 36 shows a control-flow diagram of the routine "determine start time of change" called in FIG. 32.

FIG. 36 shows a control-flow diagram of the routine "determine start time of change" called in block 3203 of FIG. 32. A loop beginning with block 3601 repeats the operations of blocks 3602-3613 for a divergence value computed in a time interval of streaming event messages. In block 3602, the counter of histogram range associated with an oldest divergence value in a histogram of divergence values is decremented. Decision blocks 3603-3606 represent histogram ranges as described above with reference to FIGS. 29A-29C. When a divergence value falls within one of the histogram ranges, the corresponding counter represented by blocks 3607-3610 is incremented. In decision block 3611, when any of the counters $C_s, \ldots, C_S$ is greater than zero, control flows to block 3612. In block 3612, the time interval associated with the divergence value is identified as having the change. In decision block 3613, blocks 3602 are repeated for another received divergence value.

Figure 37:
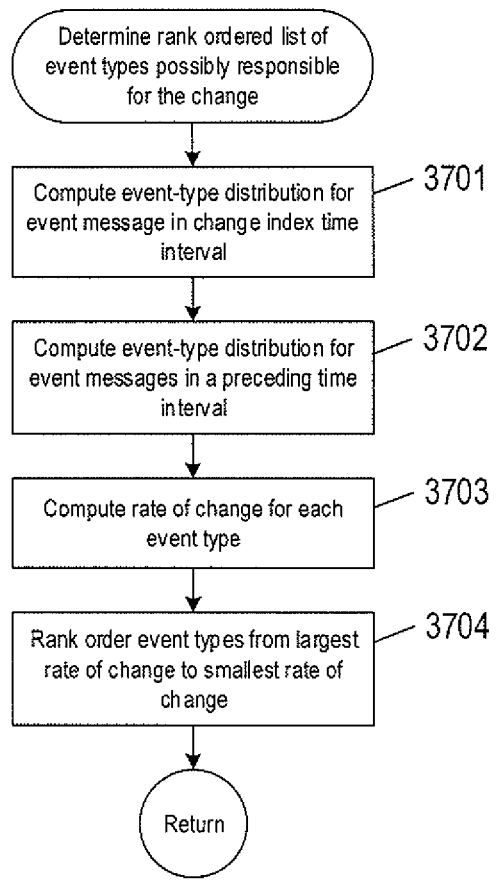
FIG. 37 shows a control-flow diagram of the routine "determine rank ordered list of event types responsible for the change" called in FIG. 32.

FIG. 37 shows a control-flow diagram of the routine "determine rank ordered list of event types responsible for the change" called in block 3204 of FIG. 32. In block 3701, a first event-type distribution is computed for event messages with time stamps in the time interval associated with the change index, as described above with reference to FIG. 30B. In block 3702, a second event-type distribution is computed for event messages with time stamps in a time interval that precedes the time interval associated with the change index, as described above with reference to FIG. 30B. In block 3703, a rate of change is computed for each event type in the first and second event type distributions as described above with reference to Equation (18). In block 3704, the event types are rank ordered from largest to smallest rate of change.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method stored in one or more data-storage devices and executed using one or more processors to detect and classify a change in a distributed computing system, the method comprising:
    computing a sequence of divergence values from event messages with time stamps in each overlapping time interval of a sliding time window applied to the event messages; and
    when a threshold violation in the sequence of divergence values is detected,
        determining a start time of a change in behavior of an event source, the start time corresponding to a time interval when the change occurred,
        rank ordering event types of event messages with time stamps in the time interval to obtain a rank ordered list of event types,
        classifying the change based on classifications of previously observed changes, and
        generating a recommendation to address the change based on the rank ordered list of event types and the classification of the change.

2. The method of claim 1 wherein computing the sequence of divergence values comprises:
    for each overlapping time interval of the sliding time window
        partitioning each time interval into a first sub-time interval and a second sub-time interval,
        determining a first event-type distribution of event messages with time stamps in the first sub-time interval,
        determining a second event-type distribution of event message with time stamps in the second sub-time interval, and
        computing a divergence value for the first and second event-type distributions.

3. The method of claim 1 wherein determining the start time of the change comprises:
    computing cumulative sums of the divergence values;
    determining a largest cumulative sum of the cumulative sums;
    identifying a change point as corresponding to a measurement index of a time interval of the sliding time window that corresponds to the largest cumulative sum;
    partitioning the sequence of divergence values into a first sequence of divergence values generated from event messages in time intervals before the change point and a second sequence of divergence values generated from event messages in time intervals after the change point;
    computing a mean square error for the first and second sequences of divergence values;
    for each measurement index of the time intervals before the change point,
        partitioning the sequence of divergence values into a first sequence of divergence values generated from event messages in time intervals before the measurement index and a second sequence of divergence values generated from event messages in time intervals after the measurement index, and
        computing a mean square error for the first and second sequences of divergence values;
    identifying a largest measurement index of the mean square error that is less than or equal to the mean square error at the change point; and
    identifying the time interval of the largest measurement index as the start time of change.

4. The method of claim 1 wherein determining the start time of the change comprises:
    receiving the sequence of divergence values;
    for each divergence value of the sequence of the divergence values
        when a divergence value falls within a histogram range of a histogram of divergence values, incrementing a counter for the histogram range;
        when the counter for a histogram range of the histogram of divergence values is greater than a standard deviation threshold, identifying a measurement index of a time interval associated with the divergence value as a change index, indicating that the start time of the change occurs in the time interval; and
        decrementing a counter of a histogram range that contains an oldest divergence value in the histogram of divergence values.

5. The method of claim 1 wherein rank ordering the event types of the event messages comprises:
    computing a first event-type distribution for event messages with time stamps in a time interval associated with a change index;
    computing a second event-type distribution for event messages with time stamps in a time interval that precedes the time interval associated with the change index;
    computing a rate of change for each event type in the first and second event type distributions; and
    rank ordering the event types from largest to smallest rates of change to obtain the rank ordered list of event types.

6. The method of claim 1 wherein classifying the change based on the classifications of the previously observed changes comprises:
    determining an event-type distribution of event messages generated in a time interval of a change point;
    computing a divergence value between the event-type distribution and each representative event-type distribution of the classifications of previously observed changes;
    determining k-nearest neighbors of representative event-type distributions to the event-type distribution as having the k-smallest divergence values; and
    classifying the change as a classification with a largest number of divergence values in the k-nearest neighbors.

7. A system to detect and classify a change in a distributed computing system, the system comprising:
    one or more processors;
    one or more data-storage devices; and
    machine-readable instructions stored in the one or more data-storage devices that, when executed using the one or more processors, control the system to carry out operations comprising:
        computing a sequence of divergence values from event messages with time stamps in each overlapping time interval of a sliding time window applied to the event messages; and
        when a threshold violation in the sequence of divergence values is detected,
            determining a start time of a change in behavior of an event source, the start time corresponding to a time interval when the change occurred,
            rank ordering event types of event messages with time stamps in the time interval to obtain a rank ordered list of event types, classifying the change based on classifications of previously observed changes, and generating a recommendation to address the change based on the rank ordered list of event types and the classification of the change.

8. The system of claim 7 wherein computing the sequence of divergence values comprises:

for each overlapping time interval of the sliding time window;

partitioning each time interval into a first sub-time interval and a second sub-time interval, determining a first event-type distribution of event messages with time stamps in the first sub-time interval, determining a second event-type distribution of event message with time stamps in the second sub-time interval, and computing a divergence value for the first and second event-type distributions.

9. The system of claim 7 wherein determining the start time of the change comprises:

computing cumulative sums of the divergence values;

determining a largest cumulative sum of the cumulative sums;

identifying a change point as corresponding to a measurement index of a time interval of the sliding time window that corresponds to the largest cumulative sum;

partitioning the sequence of divergence values into a first sequence of divergence values generated from event messages in time intervals before the change point and a second sequence of divergence values generated from event messages in time intervals after the change point;

computing a mean square error for the first and second sequences of divergence values;

for each measurement index of the time intervals before the change point, partitioning the sequence of divergence values into a first sequence of divergence values generated from event messages in time intervals before the measurement index and a second sequence of divergence values generated from event messages in time intervals after the measurement index, and computing a mean square error for the first and second sequences of divergence values;

identifying a largest measurement index of the mean square error that is less than or equal to the mean square error at the change point; and identifying a time interval of the largest measurement index as the start time of change.

10. The system of claim 7 wherein determining the start time of the change comprises:

receiving the sequence of divergence values;

for each divergence value of the sequence of the divergence values when a divergence value falls within a histogram range of a histogram of divergence values, incrementing a counter for the histogram range;

when the counter for a histogram range of the histogram of divergence values is greater than a standard deviation threshold, identifying a measurement index of a time interval associated with the divergence value as a change index, indicating that the start time of the change occurs in the time interval; and decrementing a counter of a histogram range that contains an oldest divergence value in the histogram of divergence values.

11. The system of claim 7 wherein rank ordering the event types of the event messages comprises:

computing a first event-type distribution for event messages with time stamps in a time interval associated with a change index;

computing a second event-type distribution for event messages with time stamps in a time interval that precedes the time interval associated with the change index;

computing a rate of change for each event type in the first and second event-type distributions; and rank ordering the event types from largest to smallest rates of change to obtain the rank ordered list of event types.

12. The system of claim 7 wherein classifying the change based on the classifications of the previously observed changes comprises:

determining an event-type distribution of event messages generated in a time interval of a change point;

computing a divergence value between the event-type distribution and each representative event-type distribution of the classifications of previously observed changes;

determining k-nearest neighbors of representative event-type distributions to the event-type distribution as having the k-smallest divergence values; and classifying the change as a classification with a largest number of divergence values in the k-nearest neighbors.

13. A non-transitory computer-readable medium encoded with machine-readable instructions that implement a method carried out by one or more processors of a computer system to perform operations of comprising:

computing a sequence of divergence values from event messages with time stamps in each overlapping time interval of a sliding time window applied to the event messages; and when a threshold violation in the sequence of divergence values is detected, determining a start time of change in behavior of an event source, the start time corresponding to time interval when the change occurred, rank ordering event types of event messages with time stamps in the time interval to obtain a rank ordered list of event types, classifying the change based on classifications of previously observed changes, and generating a recommendation to address the change based on the rank ordered list of event types and the classification of the change.

14. The medium of claim 13 wherein computing the sequence of divergence values comprises:

for each overlapping time interval of the sliding time window partitioning each time interval into a first sub-time interval and a second sub-time interval, determining a first event-type distribution of event messages with time stamps in the first sub-time interval, determining a second event-type distribution of event message with time stamps in the second sub-time interval, and computing a divergence value for the first and second event-type distributions.

15. The medium of claim 13 wherein determining the start time of the change comprises:
- computing cumulative sums of the divergence values;
- determining a largest cumulative sum of the cumulative sums;
- identifying a change point as corresponding to a measurement index of a time interval of the sliding time window that corresponds to the largest cumulative sum;
- partitioning the sequence of divergence values into a first sequence of divergence values generated from event messages in time intervals before the change point and a second sequence of divergence values generated from event messages in time intervals after the change point;
- computing a mean square error for the first and second sequences of divergence values;
- for each measurement index of the time intervals before the change point,
  - partitioning the sequence of divergence values into a first sequence of divergence values generated from event messages in time intervals before the measurement index and a second sequence of divergence values generated from event messages in time intervals after the measurement index, and
  - computing a mean square error for the first and second sequences of divergence values;
- identifying a largest measurement index of the mean square error that is less than or equal to the mean square error at the change point; and
- identifying a time interval of the largest measurement index as the start time of change.

16. The medium of claim 13 wherein determining the start time of the change comprises:
- receiving the sequence of divergence values;
- for each divergence value of the sequence of the divergence values
  - when a divergence value falls within a histogram range of a histogram of divergence values, incrementing a counter for the histogram range;
  - when the counter for a histogram range of the histogram of divergence values is greater than a standard deviation threshold, identifying a measurement index of a time interval associated with the divergence value as a change index, indicating that the start time of the change occurs in the time interval; and
- decrementing a counter of a histogram range that contains an oldest divergence value in the histogram of divergence values.

17. The medium of claim 13 wherein rank ordering the event types of the event messages comprises:
- computing a first event-type distribution for event messages with time stamps in the time interval associated with the change index;
- computing a second event-type distribution for event messages with time stamps in a time interval that precedes the time interval associated with the change index;
- computing a rate of change for each event type in the first and second event-type distributions; and
- rank ordering event types from largest to smallest rates of change to obtain the list of event types.

18. The medium of claim 13 wherein classifying the change based on the classifications of the previously observed changes comprises:
- determining an event-type distribution of event messages generated in the time interval of the change point;
- computing a divergence value between the event-type distribution and each representative event-type distribution of the classifications of previously observed changes;
- determining k-nearest neighbors of representative event-type distributions to the event-type distribution as having the k-smallest divergence values; and
- classifying the change as a classification with a largest number of divergence values in the k-nearest neighbors.

* * * * *